United States Patent
Murata et al.

(10) Patent No.: US 10,175,494 B2
(45) Date of Patent: Jan. 8, 2019

(54) POLARIZING PLATE SUITABLE FOR LIQUID CRYSTAL DISPLAY DEVICE CAPABLE OF DISPLAYING THREE-DIMENSIONAL IMAGES, AND LIQUID CRYSTAL DISPLAY DEVICE

(75) Inventors: Kouichi Murata, Tsuruga (JP); Yoshitomo Ikehata, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 14/118,115

(22) PCT Filed: May 16, 2012

(86) PCT No.: PCT/JP2012/062476
§ 371 (c)(1),
(2), (4) Date: Nov. 15, 2013

(87) PCT Pub. No.: WO2012/157662
PCT Pub. Date: Nov. 22, 2012

(65) Prior Publication Data
US 2014/0104519 A1    Apr. 17, 2014

(30) Foreign Application Priority Data

May 18, 2011 (JP) ................. 2011-111023

(51) Int. Cl.
G02F 1/1335 (2006.01)
G02F 1/13363 (2006.01)
G02B 5/30 (2006.01)
G02B 27/26 (2006.01)

(52) U.S. Cl.
CPC ........... *G02B 27/26* (2013.01); *G02B 5/3033* (2013.01); *G02B 5/3083* (2013.01); *G02B 5/3091* (2013.01); *G02F 1/13362* (2013.01); *G02F 1/133528* (2013.01)

(58) Field of Classification Search
CPC ............ G02F 1/13363; G02F 2202/40; G02F 1/133528; G02F 2201/50; G02F 1/133611; G02F 1/13362; G02F 2001/133638; G02B 5/3083; G02B 5/3033; G02B 1/111; G02B 5/3025; G02B 27/26; Y10T 428/1041
USPC .................................................. 349/117, 181
See application file for complete search history.

(56) References Cited

U.S. PATENT DOCUMENTS

| | | | |
|---|---|---|---|
| 4,072,779 A * | 2/1978 | Knox ................ | B32B 17/10009 264/290.2 |
| 4,586,790 A | 5/1986 | Umeda et al. | |
| 4,592,623 A * | 6/1986 | Yamamoto .......... | G02B 5/3033 349/122 |
| 4,799,772 A | 1/1989 | Utsumi | |
| 5,145,746 A | 9/1992 | Tomoyuki | |
| 5,231,145 A | 7/1993 | Brueckmann et al. | |
| 5,677,024 A | 10/1997 | Abe et al. | |
| 5,998,925 A * | 12/1999 | Shimizu ............. | C09K 11/7767 257/103 |
| 6,025,433 A | 2/2000 | Shibatoh et al. | |
| 6,055,096 A | 4/2000 | Michihata et al. | |
| 6,069,440 A | 5/2000 | Shimizu et al. | |
| 6,104,484 A | 8/2000 | Nagata et al. | |
| 6,521,700 B1 | 2/2003 | Dworak et al. | |
| 6,608,332 B2 | 8/2003 | Shimizu et al. | |
| 6,614,179 B1 | 9/2003 | Shimizu et al. | |
| 6,839,171 B2 | 1/2005 | Mizutani et al. | |
| 7,026,756 B2 | 4/2006 | Shimizu et al. | |
| 7,071,616 B2 | 7/2006 | Shimizu et al. | |
| 7,126,274 B2 | 10/2006 | Shimizu et al. | |
| 7,128,952 B2 | 10/2006 | Murakami et al. | |
| 7,215,074 B2 | 5/2007 | Shimizu et al. | |
| 7,329,988 B2 | 2/2008 | Shimizu et al. | |
| 7,362,048 B2 | 4/2008 | Shimizu et al. | |
| 7,531,960 B2 | 5/2009 | Shimizu et al. | |
| 7,569,269 B2 | 8/2009 | Takada et al. | |
| 7,633,583 B2 | 12/2009 | Wang et al. | |
| 7,682,848 B2 | 3/2010 | Shimizu et al. | |
| 7,781,068 B2 | 8/2010 | Nakamura et al. | |
| 7,855,092 B2 | 12/2010 | Shimizu et al. | |
| 7,887,718 B2 | 2/2011 | Nagatomi et al. | |

(Continued)

FOREIGN PATENT DOCUMENTS

CN    1320219 A    10/2001
CN    1331272 A    1/2002
(Continued)

OTHER PUBLICATIONS

Japanese Patent Office, Notice of Information Offer in Japanese Patent Application No. 2012-132122 (dated Jul. 15, 2014).
European Patent Office, Extended European Search Report in European Patent Application No. 12786442.9 (dated Nov. 4, 2014).
Ishikawa, Kenji, "3D Stereoscopic Images are Coming," Ohmsa Ltd., pp. 62-118 (Apr. 25, 2010).

(Continued)

*Primary Examiner* — Jia Pan

(74) *Attorney, Agent, or Firm* — Leydig, Voit & Mayer, Ltd.

(57) ABSTRACT

Provided is a polarizer whereby screen brightness does not become zero regardless of the direction in which a viewer faces when the polarizer is used in a liquid crystal display device capable of displaying three-dimensional images, in which three-dimensional images are visible through a polarizing filter. The polarizer comprises a polarizing film and protective films disposed on both sides of the polarizing film; at least one of the protective films being an oriented film; and the tilt of the orientation axis or an axis orthogonal to the orientation axis of the oriented film relative to the polarization axis of the polarizing film being 1° or more and less than 45°.

19 Claims, No Drawings

(56) References Cited

U.S. PATENT DOCUMENTS

| | | |
|---|---|---|
| 7,901,959 B2 | 3/2011 | Shimizu et al. |
| 7,911,553 B2 | 3/2011 | Tanaka |
| 7,915,631 B2 | 3/2011 | Shimizu et al. |
| 7,943,941 B2 | 5/2011 | Shimizu et al. |
| 7,968,019 B2 | 6/2011 | Murakami |
| 7,968,866 B2 | 6/2011 | Shimizu et al. |
| 7,969,090 B2 | 6/2011 | Shimizu et al. |
| 8,139,042 B2 | 3/2012 | Iijima |
| 8,148,177 B2 | 4/2012 | Shimizu et al. |
| 8,274,631 B2 | 9/2012 | Wang et al. |
| 8,687,152 B2 | 4/2014 | Izaki et al. |
| 8,760,601 B2 | 6/2014 | Izaki et al. |
| 2001/0001207 A1 | 5/2001 | Shimizu et al. |
| 2002/0061959 A1 | 5/2002 | Kajimaru et al. |
| 2003/0156235 A1 | 8/2003 | Kuzuhara et al. |
| 2004/0000868 A1 | 1/2004 | Shimizu et al. |
| 2004/0004437 A1 | 1/2004 | Shimizu et al. |
| 2004/0090180 A1 | 5/2004 | Shimizu et al. |
| 2004/0109302 A1 | 6/2004 | Yoneda et al. |
| 2004/0137265 A1 | 7/2004 | Shimada et al. |
| 2004/0222435 A1 | 11/2004 | Shimizu et al. |
| 2004/0265539 A1 | 12/2004 | Hashimoto et al. |
| 2005/0030456 A1 | 2/2005 | Murakami et al. |
| 2005/0100723 A1 | 5/2005 | Tanaka et al. |
| 2005/0106334 A1 | 5/2005 | Kubo et al. |
| 2005/0134774 A1 | 6/2005 | Coates et al. |
| 2005/0168816 A1* | 8/2005 | Fukaishi ............... G02B 27/26 359/465 |
| 2005/0247223 A1 | 11/2005 | Sampei |
| 2005/0275779 A1 | 12/2005 | Nanno |
| 2005/0280357 A1 | 12/2005 | Shimizu et al. |
| 2006/0039070 A1 | 2/2006 | Sugimura et al. |
| 2006/0066946 A1 | 3/2006 | Liu et al. |
| 2006/0216437 A1 | 9/2006 | Murakami |
| 2006/0227439 A1 | 10/2006 | Taki et al. |
| 2006/0275559 A1 | 12/2006 | Ishibashi et al. |
| 2007/0008451 A1 | 1/2007 | Tanaka |
| 2007/0009676 A1 | 1/2007 | Tamagawa et al. |
| 2007/0046864 A1 | 3/2007 | Maruyama et al. |
| 2007/0046865 A1 | 3/2007 | Umeda et al. |
| 2007/0048460 A1 | 3/2007 | Ikeda |
| 2007/0054066 A1 | 3/2007 | Usukura et al. |
| 2007/0114914 A1 | 5/2007 | Shimizu et al. |
| 2007/0159060 A1 | 7/2007 | Shimizu et al. |
| 2007/0178297 A1 | 8/2007 | Takada et al. |
| 2007/0202272 A1 | 8/2007 | Yamamoto et al. |
| 2007/0224415 A1 | 9/2007 | Satake et al. |
| 2007/0238049 A1 | 10/2007 | Ezure |
| 2007/0242199 A1 | 10/2007 | Harada |
| 2007/0264447 A1 | 11/2007 | Oya et al. |
| 2007/0285776 A1 | 12/2007 | Nakamura et al. |
| 2008/0049324 A1 | 2/2008 | Murakami et al. |
| 2008/0050583 A1 | 2/2008 | Kubo |
| 2008/0131704 A1 | 6/2008 | Mizuno et al. |
| 2008/0138527 A1 | 6/2008 | Okuma et al. |
| 2008/0138918 A1 | 6/2008 | Shimizu et al. |
| 2008/0218666 A1 | 9/2008 | Toyooka |
| 2008/0233312 A1* | 9/2008 | Nakamura ............... G02B 1/105 428/1.31 |
| 2008/0266500 A1 | 10/2008 | Nimura |
| 2008/0303995 A1 | 12/2008 | Shimodaira et al. |
| 2009/0027599 A1 | 1/2009 | Ohgaru et al. |
| 2009/0059134 A1 | 3/2009 | Ishikawa et al. |
| 2009/0104413 A1 | 4/2009 | Ahn et al. |
| 2009/0139564 A1 | 6/2009 | Miyaji et al. |
| 2009/0153965 A1 | 6/2009 | Ito et al. |
| 2009/0244474 A1 | 10/2009 | Fuchida et al. |
| 2009/0251643 A1* | 10/2009 | Yamada ............... C08J 5/18 349/96 |
| 2009/0280310 A1* | 11/2009 | Nitta ............... C08J 5/18 428/220 |
| 2009/0303481 A1 | 12/2009 | Nakai |
| 2009/0315014 A1 | 12/2009 | Shimizu et al. |
| 2009/0315015 A1 | 12/2009 | Shimizu et al. |
| 2009/0316068 A1 | 12/2009 | Shimizu et al. |
| 2010/0001258 A1 | 1/2010 | Shimizu et al. |
| 2010/0002171 A1 | 1/2010 | Yoshimi |
| 2010/0006819 A1 | 1/2010 | Shimizu et al. |
| 2010/0019224 A1 | 1/2010 | Shimizu et al. |
| 2010/0019270 A1 | 1/2010 | Shimizu et al. |
| 2010/0053511 A1 | 3/2010 | Ohmuro et al. |
| 2010/0073313 A1 | 3/2010 | Iijima |
| 2010/0098939 A1 | 4/2010 | Tada et al. |
| 2010/0117516 A1 | 5/2010 | Shimizu et al. |
| 2010/0177397 A1 | 7/2010 | Kamiyama et al. |
| 2010/0220266 A1* | 9/2010 | Kashima ............... G02B 1/105 349/96 |
| 2010/0233389 A1 | 9/2010 | Suzuki et al. |
| 2010/0264841 A1 | 10/2010 | Shimizu et al. |
| 2010/0264842 A1 | 10/2010 | Shimizu et al. |
| 2010/0296027 A1 | 11/2010 | Matsuhira et al. |
| 2011/0019275 A1 | 1/2011 | Suzuki |
| 2011/0053299 A1 | 3/2011 | Shimieu et al. |
| 2011/0062864 A1 | 3/2011 | Shimizu et al. |
| 2011/0085106 A1 | 4/2011 | Obata et al. |
| 2011/0128477 A1* | 6/2011 | Izaki ............... H01L 51/5275 349/96 |
| 2011/0177314 A1 | 7/2011 | Tatami et al. |
| 2011/0194048 A1* | 8/2011 | Izaki ............... G02F 1/133528 349/62 |
| 2011/0199561 A1 | 8/2011 | Hasegawa et al. |
| 2011/0297990 A1 | 12/2011 | Shimizu et al. |
| 2012/0015169 A1* | 1/2012 | Ohta ............... B29D 11/00865 428/216 |
| 2012/0057230 A1 | 3/2012 | Murakami et al. |
| 2012/0113356 A1 | 5/2012 | Yu et al. |
| 2012/0113671 A1 | 5/2012 | Sadasivan et al. |
| 2012/0121824 A1 | 5/2012 | Toyama et al. |
| 2012/0189831 A1 | 7/2012 | Kawasaki et al. |
| 2012/0229732 A1 | 9/2012 | Koike et al. |
| 2012/0250142 A1 | 10/2012 | Kobuchi et al. |
| 2013/0039031 A1 | 2/2013 | Asano et al. |
| 2013/0100378 A1 | 4/2013 | Murata et al. |
| 2013/0194211 A1 | 8/2013 | Shinohara et al. |
| 2013/0272020 A1 | 10/2013 | Koide et al. |
| 2013/0301130 A1 | 11/2013 | Nakamura et al. |
| 2014/0028625 A1 | 1/2014 | Maeda et al. |
| 2014/0104519 A1 | 4/2014 | Murata et al. |
| 2014/0232951 A1 | 8/2014 | Ueda et al. |
| 2014/0293197 A1 | 10/2014 | Shin et al. |
| 2015/0131038 A1 | 5/2015 | Ishiguro et al. |
| 2015/0131043 A1 | 5/2015 | Yamamoto et al. |
| 2015/0168779 A1 | 6/2015 | Kim et al. |
| 2015/0316696 A1 | 11/2015 | Kamijo et al. |
| 2015/0331282 A1 | 11/2015 | Yamada et al. |
| 2016/0011355 A1 | 1/2016 | Kokudo et al. |
| 2016/0048057 A1 | 2/2016 | Sekiguchi et al. |
| 2016/0209564 A1 | 7/2016 | Kuroda |

FOREIGN PATENT DOCUMENTS

| | | |
|---|---|---|
| CN | 1623107 A | 6/2005 |
| CN | 1641897 A | 7/2005 |
| CN | 1656399 A | 8/2005 |
| CN | 1839176 A | 9/2006 |
| CN | 1892360 A | 1/2007 |
| CN | 1916667 A | 2/2007 |
| CN | 1927996 A | 3/2007 |
| CN | 1957273 A | 5/2007 |
| CN | 101156092 A | 4/2008 |
| CN | 101273465 A | 9/2008 |
| CN | 101358144 A | 2/2009 |
| CN | 101661190 A | 3/2010 |
| CN | 101799564 A | 8/2010 |
| CN | 1495925 A | 5/2014 |
| EP | 2871055 A1 | 5/2015 |
| JP | S14-018675 Y | 11/1939 |
| JP | S49-060317 A | 6/1974 |
| JP | S51-066163 U | 5/1976 |
| JP | S52-010100 A | 1/1977 |
| JP | S54-139921 A | 10/1979 |
| JP | S56-033611 A | 4/1981 |
| JP | S58-098709 A | 6/1983 |

(56) References Cited

FOREIGN PATENT DOCUMENTS

| | | |
|---|---|---|
| JP | S58-143305 A | 8/1983 |
| JP | S59-077401 A | 5/1984 |
| JP | S60-026304 A | 2/1985 |
| JP | S60-097323 A | 5/1985 |
| JP | S60-133402 U | 9/1985 |
| JP | S62-135338 A | 6/1987 |
| JP | S63-226603 A | 9/1988 |
| JP | S63-307403 A | 12/1988 |
| JP | H03-125302 U1 | 12/1991 |
| JP | H04-163138 A | 6/1992 |
| JP | 04-224811 A | 8/1992 |
| JP | H04-256903 A | 9/1992 |
| JP | H06-051117 A | 2/1994 |
| JP | 06-258634 A | 9/1994 |
| JP | 08-271733 A | 10/1996 |
| JP | 08-271734 A | 10/1996 |
| JP | 09-033722 A | 2/1997 |
| JP | 09-166711 A | 6/1997 |
| JP | H09-169950 A | 6/1997 |
| JP | 09-314782 A | 12/1997 |
| JP | 10-010522 A | 1/1998 |
| JP | H10-010558 A | 1/1998 |
| JP | 10-107325 A | 4/1998 |
| JP | H10-133817 A | 5/1998 |
| JP | H10-161108 A | 6/1998 |
| JP | 10-242513 A | 9/1998 |
| JP | H10-268270 A | 10/1998 |
| JP | 11-070629 A | 3/1999 |
| JP | 2000-082335 A | 3/2000 |
| JP | 2000-082338 A | 3/2000 |
| JP | 2000-141530 A | 5/2000 |
| JP | 2000-162419 A | 6/2000 |
| JP | 2000-206333 A | 7/2000 |
| JP | 2000-208815 A | 7/2000 |
| JP | 2000-231450 A | 8/2000 |
| JP | 2000-296595 A | 10/2000 |
| JP | 2001-026762 A | 1/2001 |
| JP | 2001-059907 A | 3/2001 |
| JP | 2001-116926 A | 4/2001 |
| JP | 2001-181568 A | 7/2001 |
| JP | 2002-231032 A | 8/2001 |
| JP | 2001-272534 A | 10/2001 |
| JP | 2001-272682 A | 10/2001 |
| JP | 2001-334623 A | 12/2001 |
| JP | 2002-071921 A | 3/2002 |
| JP | 2002-088334 A | 3/2002 |
| JP | 2002-509283 A | 3/2002 |
| JP | 2002-116320 A | 4/2002 |
| JP | 2002-116877 A | 4/2002 |
| JP | 2002-198573 A | 7/2002 |
| JP | 2003-121818 A | 4/2003 |
| JP | 2003-121819 A | 4/2003 |
| JP | 2003-179259 A | 6/2003 |
| JP | 2004-005540 A | 1/2004 |
| JP | 2004-009362 A | 1/2004 |
| JP | 2004-170875 A | 6/2004 |
| JP | 2004-189957 A | 7/2004 |
| JP | 2004-205773 A | 7/2004 |
| JP | 2004-214069 A | 7/2004 |
| JP | 2004-219620 A | 8/2004 |
| JP | 2004-226591 A | 8/2004 |
| JP | 2004-226734 A | 8/2004 |
| JP | 2004-237451 A | 8/2004 |
| JP | 2004-252082 A | 9/2004 |
| JP | 2004-361774 A | 12/2004 |
| JP | 2005-114990 A | 4/2005 |
| JP | 2005-148519 A | 6/2005 |
| JP | 2005-157082 A | 6/2005 |
| JP | 2005-173462 A | 6/2005 |
| JP | 2005-181450 A | 7/2005 |
| JP | 2005-265889 A | 9/2005 |
| JP | 2005-266464 A | 9/2005 |
| JP | 2005-317985 A | 11/2005 |
| JP | 2005-321543 A | 11/2005 |
| JP | 2005-352068 A | 12/2005 |
| JP | 2006-062281 A | 3/2006 |
| JP | 2006-079067 A | 3/2006 |
| JP | 2006-106427 A | 4/2006 |
| JP | 2006-133652 A | 5/2006 |
| JP | 2006-215107 A | 8/2006 |
| JP | 2006-215175 A | 8/2006 |
| JP | 2006-251294 A | 9/2006 |
| JP | 2006-276574 A | 10/2006 |
| JP | 2006-276697 A | 10/2006 |
| JP | 2006-301592 A | 11/2006 |
| JP | 2006-335853 A | 12/2006 |
| JP | 2007-039535 A | 2/2007 |
| JP | 2007-055222 A | 3/2007 |
| JP | 2007-059360 A | 3/2007 |
| JP | 2007-152932 A | 6/2007 |
| JP | 2007-171707 A | 7/2007 |
| JP | 2007-233114 A | 9/2007 |
| JP | 2007-253512 A | 10/2007 |
| JP | 2007-279243 A | 10/2007 |
| JP | 2007-279469 A | 10/2007 |
| JP | 2007-286447 A | 11/2007 |
| JP | 2007-304391 A | 11/2007 |
| JP | 2008-003425 A | 1/2008 |
| JP | 2008-030370 A | 2/2008 |
| JP | 2008-083115 A | 4/2008 |
| JP | 2008-090216 A | 4/2008 |
| JP | 2008-132768 A | 6/2008 |
| JP | 2008-155435 A | 7/2008 |
| JP | 2008-160140 A | 7/2008 |
| JP | 2008-163078 A | 7/2008 |
| JP | 2008-192620 A | 8/2008 |
| JP | 2008-208223 A | 9/2008 |
| JP | 2008-537803 A | 9/2008 |
| JP | 2008-256747 A | 10/2008 |
| JP | 2008-266392 A | 11/2008 |
| JP | 2008-281866 A | 11/2008 |
| JP | 2009-006543 A | 1/2009 |
| JP | 2009-014886 A | 1/2009 |
| JP | 2009-102573 A | 5/2009 |
| JP | 2009-109995 A | 5/2009 |
| JP | 2009-139526 A | 6/2009 |
| JP | 2009-143226 A | 7/2009 |
| JP | 2009-157347 A | 7/2009 |
| JP | 2009-157348 A | 7/2009 |
| JP | 2009-157361 A | 7/2009 |
| JP | 2009-160830 A | 7/2009 |
| JP | 2009-169389 A | 7/2009 |
| JP | 2009160830 A * | 7/2009 |
| JP | 2009-175685 A | 8/2009 |
| JP | 2009-251035 A | 10/2009 |
| JP | 2009-269174 A | 11/2009 |
| JP | 2009-269301 A | 11/2009 |
| JP | 2009-282424 A | 12/2009 |
| JP | 2009-288395 A | 12/2009 |
| JP | 2009-294675 A | 12/2009 |
| JP | 2009-300611 A | 12/2009 |
| JP | 2009-300955 A | 12/2009 |
| JP | 2010-026112 A | 2/2010 |
| JP | 2010-032718 A | 2/2010 |
| JP | 2010-044200 A | 2/2010 |
| JP | 2010-054750 A | 3/2010 |
| JP | 2010-054913 A | 3/2010 |
| JP | 2010-046816 A | 4/2010 |
| JP | 2010-079481 A | 4/2010 |
| JP | 2010-080290 A | 4/2010 |
| JP | 2010-096948 A | 4/2010 |
| JP | 2010-107892 A | 5/2010 |
| JP | 2010-113054 A | 5/2010 |
| JP | 2010-139938 A | 6/2010 |
| JP | 2010-209126 A | 9/2010 |
| JP | 2010-217844 A | 9/2010 |
| JP | 2010-224345 A | 10/2010 |
| JP | 2010-224512 A | 10/2010 |
| JP | 2010-243630 A | 10/2010 |
| JP | 2010-244059 A | 10/2010 |
| JP | 2010-271509 A | 12/2010 |
| JP | 2010-277028 A | 12/2010 |
| JP | 2011-005854 A | 1/2011 |
| JP | 2011-007830 A | 1/2011 |

(56) References Cited

FOREIGN PATENT DOCUMENTS

| | | |
|---|---|---|
| JP | 2011-008169 A | 1/2011 |
| JP | 2011-008170 A | 1/2011 |
| JP | 2011-013402 A | 1/2011 |
| JP | 2011-028945 A | 2/2011 |
| JP | 2011-053271 A | 3/2011 |
| JP | 2011-059488 A | 3/2011 |
| JP | 2011-067952 A | 4/2011 |
| JP | 2011-081359 A | 4/2011 |
| JP | 2011-088429 A | 5/2011 |
| JP | 2011-090042 A | 5/2011 |
| JP | 2011-099089 A | 5/2011 |
| JP | 2011-107198 A | 6/2011 |
| JP | 2011-110718 A | 6/2011 |
| JP | 2011-126158 A | 6/2011 |
| JP | 2011-140139 A | 7/2011 |
| JP | 2011-140140 A | 7/2011 |
| JP | 2011-167914 A | 9/2011 |
| JP | 2011-181875 A | 9/2011 |
| JP | 2011-186290 A | 9/2011 |
| JP | 2011-195692 A | 10/2011 |
| JP | 2011-208147 A | 10/2011 |
| JP | 2011-215295 A | 10/2011 |
| JP | 2011-215646 A | 10/2011 |
| JP | 2012-003007 A | 1/2012 |
| JP | 2012-003259 A | 1/2012 |
| JP | 2012-025027 A | 2/2012 |
| JP | 2012-025850 A | 2/2012 |
| JP | 2012-083744 A | 4/2012 |
| JP | 2012-091336 A | 5/2012 |
| JP | 2012-103470 A | 5/2012 |
| JP | 4962661 B2 | 6/2012 |
| JP | 2012-198879 A | 10/2012 |
| JP | 5051328 B1 | 10/2012 |
| JP | 2012-214026 A | 11/2012 |
| JP | 2012-214056 A | 11/2012 |
| JP | 2012-215623 A | 11/2012 |
| JP | 2012-215724 A | 11/2012 |
| JP | 2012-220879 A | 11/2012 |
| JP | 2012-256014 A | 12/2012 |
| JP | 2013-003952 A | 1/2013 |
| JP | 2013-029919 A | 2/2013 |
| JP | 4888853 B2 | 2/2013 |
| JP | 2013-054207 A | 3/2013 |
| JP | 2013-079993 A | 5/2013 |
| JP | 2013-109116 A | 6/2013 |
| JP | 2013-539598 A | 10/2013 |
| JP | 2013-254171 A | 12/2013 |
| JP | 5370601 B | 12/2013 |
| JP | 2014-010315 A | 1/2014 |
| JP | 2014-010316 A | 1/2014 |
| JP | 2014-011318 A | 1/2014 |
| JP | 2014-012373 A | 1/2014 |
| JP | 2014-013367 A | 1/2014 |
| JP | 2014-015035 A | 1/2014 |
| JP | 2014-016590 A | 1/2014 |
| JP | 2014-016591 A | 1/2014 |
| JP | 2014-032275 A | 2/2014 |
| JP | 2014-044389 A | 3/2014 |
| JP | 2014-170223 A | 9/2014 |
| JP | 2014-215473 A | 11/2014 |
| JP | 2014-219438 A | 11/2014 |
| JP | 2015-055680 A | 3/2015 |
| JP | 2015-094903 A | 5/2015 |
| JP | 2015-141346 A | 8/2015 |
| JP | 2015-215577 A | 12/2015 |
| JP | 2015-224267 A | 12/2015 |
| JP | 2016-021000 A | 2/2016 |
| JP | 2016-504632 A | 2/2016 |
| KR | 2003-0060787 A | 7/2003 |
| KR | 2006-0056995 A | 5/2006 |
| KR | 2010-0048187 A | 5/2010 |
| KR | 2010-0078564 A | 7/2010 |
| KR | 20110014515 A | 2/2011 |
| KR | 10-1337005 B1 | 12/2013 |
| TW | 575501 B | 2/2004 |
| TW | 200428041 A | 12/2004 |
| TW | 200704686 A | 2/2007 |
| TW | 200819871 A | 5/2008 |
| TW | 200827787 A | 7/2008 |
| TW | 200831962 A | 8/2008 |
| TW | 200931083 A | 7/2009 |
| TW | 201017236 A | 5/2010 |
| TW | 2010-22016 A | 6/2010 |
| TW | 201022794 A | 6/2010 |
| TW | 201035605 A | 10/2010 |
| TW | 201043675 A | 12/2010 |
| TW | 201128264 A | 8/2011 |
| TW | 201131218 A | 9/2011 |
| TW | 201142380 A | 12/2011 |
| TW | 201205160 A | 2/2012 |
| TW | 201207012 A | 2/2012 |
| TW | 201300893 A | 1/2013 |
| WO | WO 1999/036814 A1 | 7/1999 |
| WO | WO 2000/007046 A1 | 2/2000 |
| WO | WO 2003/074611 A1 | 9/2003 |
| WO | WO 2005/050269 A1 | 6/2005 |
| WO | WO 2006/113164 A1 | 10/2006 |
| WO | WO 2007/020909 A1 | 2/2007 |
| WO | WO 2007/023929 A1 | 3/2007 |
| WO | WO 2008/047785 A1 | 4/2008 |
| WO | WO 2010/050355 A1 | 5/2010 |
| WO | WO 2010/079555 A1 | 7/2010 |
| WO | WO 2010/110549 A2 | 9/2010 |
| WO | WO 2011/030757 A1 | 3/2011 |
| WO | WO 2011/058774 A1 | 5/2011 |
| WO | WO 2011/114884 A1 | 9/2011 |
| WO | WO 2011/162198 A1 | 12/2011 |
| WO | WO 2012/021643 A2 | 2/2012 |
| WO | WO 2012/026192 A1 | 3/2012 |
| WO | WO 2012/033141 A1 | 3/2012 |
| WO | WO 2012/049977 A1 | 4/2012 |
| WO | WO 2012/141147 A1 | 10/2012 |
| WO | WO 2012/157662 A1 | 11/2012 |
| WO | WO 2012/157663 A1 | 11/2012 |
| WO | WO 2013/069162 A1 | 5/2013 |
| WO | WO 2013/080949 A1 | 6/2013 |
| WO | WO 2013/100042 A1 | 7/2013 |
| WO | WO 2013/187134 A1 | 12/2013 |
| WO | WO 2014/021242 A1 | 2/2014 |
| WO | WO 2014/042022 A1 | 3/2014 |
| WO | WO 2014/132726 A1 | 9/2014 |
| WO | WO 2014/171386 A1 | 10/2014 |
| WO | WO 2014/203894 A1 | 12/2014 |
| WO | WO 2014/208519 A1 | 12/2014 |

OTHER PUBLICATIONS

Kobayashi et al., 58th SPSJ Annual Meeting, *Polymer Preprints*, Japan, 58(1): 1362 (May 12, 2009).
Kobayashi et al., 58th SPSJ Symposium on Macromolecules, *Polymer Preprints*, Japan, 58(2): 4144 (Sep. 1, 2009).
Kobayashi et al., *The Fifteenth Microoptics Conference, Technical Digest*, pp. 30-31 (Oct. 25, 2009).
Kobayashi et al., "A Novel High Retardation Polymer Film for Liquid Crystal Displays," FMCp-31, pp. 871-874, presented at 16th International Display Workshops (IDW '09), World Convention Center Summit, Miyazaki, Japan, pp. 1-209 and cover pages (Dec. 9-11, 2009).
Japanese Patent Office, Office Action in Japanese Patent Application No. 2009-259054 (dated Aug. 3, 2010).
Japanese Patent Office, Office Action in Japanese Patent Application No. 2009-259054 (dated May 24, 2011).
Japanese Patent Office, Office Action in Japanese Patent Application No. 2011-160702 (dated Apr. 10, 2012).
Japanese Patent Office, International Search Report in International Application No. PCT/JP2012/083848 (dated Apr. 2, 2013).
Japanese Patent Office, International Search Report in International Patent Application No. PCT/JP2010/057956 (dated Aug. 10, 2010).
Japanese Patent Office, International Search Report in International Patent Application No. PCT/JP2011/064026 (dated Jul. 12, 2011).
Japanese Patent Office, International Search Report in International Patent Application No. PCT/JP2012/062476 (dated Jun. 26, 2012).

(56) References Cited

OTHER PUBLICATIONS

Japanese Patent Office, International Search Report in International Patent Application No. PCT/JP2012/062477 (dated Jul. 10, 2012).
Japanese Patent Office, International Search Report in International Patent Application No. PCT/JP2013/071201 (dated Sep. 10, 2013).
Japanese Patent Office, International Search Report in International Patent Application No. PCT/JP2013/070428 (dated Oct. 15, 2013).
Japanese Patent Office, Notice of Reasons for Rejection in Japanese Patent Application No. 2011-160702 (dated Apr. 2, 2013).
Japanese Patent Office, Notice of Observations by Third Parties in Japanese Patent Application No. 2011-160702 (dated Jul. 2, 2013).
Japanese Patent Office, International Search Report in International Patent Application No. PCT/JP2012/083849 (dated Mar. 12, 2013).
Japanese Patent Office, International Search Report in International Patent Application No. PCT/JP2012/083853 (dated Mar. 19, 2013).
Japanese Patent Office, Notice of Reasons for Rejection in Japanese Patent Application No. 2012-132122 (dated Dec. 3, 2013).
Japanese Patent Office, Decision of Rejection in Japanese Patent Application No. 2012-132122 (dated Jan. 13, 2015).
Japanese Patent Office, International Search Report in International Patent Application No. PCT/JP2014/052850 (dated Mar. 4, 2014).
Hirosaki et al., "White Light-emitting Diode Lamps for Lighting Applications," *Fujikura Technical Journal*, 109: 1-4 (Oct. 2005).
National Institute for Materials Science, "Success in Trial Production of White LED for Liquid Crystal Backlight—Improvement in Color Reproducibility of Liquid Crystal Display," Press Release (Mar. 19, 2008).
NEC, "LED Performance Required for Liquid Crystal Display for Industrial Use and LED B/L Technology," *NEC Technical Journal*, vol. 60, No. 3/2007 (Sep. 2007).
Sharp Corporation, "LED Device for Liquid Crystal TV Backlight," Sharp *Technical Journal*, 99: 20-22 (Aug. 2009).
Tanaka, Kazushi, "Current Status and Future Perspective of Liquid Crystal Related Market in 2008, vol. 2," pp. 379-382 (Fuji Chimera Research Institute, Inc., Jul. 28, 2008).
Japanese Patent Office, Submission of Information by a Third Party in Japanese Patent Application No. 2012-132122 (Jan. 28, 2014).
Japanese Patent Office, Notice of Reasons for Rejection in Japanese Patent Application No. 2012-132122 (dated Apr. 8, 2014).
Japanese Patent Office, International Search Report in International Patent Application No. PCT/JP2014/052849 (dated Apr. 28, 2014).
Japanese Patent Office, International Search Report in International Patent Application No. PCT/JP2014/062301 (dated Jul. 8, 2014).
Japanese Patent Office, International Search Report in International Patent Application No. PCT/JP2014/062286 (dated Jul. 22, 2014).
Taiwan Patent Office, Notification for the Opinion of Examination in Taiwanese Patent Application No. 102127019 (dated Apr. 10, 2015).
Taiwan Patent Office, Notification for the Opinions of Examination in Taiwanese Patent Application No. 101144456 (dated Mar. 20, 2015).
Japanese Patent Office, International Search Report in International Patent Application No. PCT/JP2014/060377 (dated Jun. 24, 2014).
Wikipedia, "Backlight" (Dec. 4, 2015) [available on the internet at: https://en.wikipedia.org/wiki/Backlight].
European Patent Office, Communication Pursuant to Rule 114(2) EPC in European Patent Application No. 14186320.9 (dated Nov. 18, 2015).
Japanese Patent Office, Notification of Reasons for Refusal in Japanese Patent Application No. 2012-174967 (dated Mar. 8, 2016).
Japanese Patent Office, Notification of Reasons for Refusal in Japanese Patent Application No. 2012-174968 (dated Mar. 8, 2016).
Japanese Patent Office, Notification of Reasons for Refusal in Japanese Patent Application No. 2012-174969 (dated Mar. 8, 2016).
Japanese Patent Office, Notification of Reasons for Refusal in Japanese Patent Application No. 2012-175930 (dated Mar. 8, 2016).
Japanese Patent Office, Notification of Reasons for Refusal in Japanese Patent Application No. 2012-198501 (dated Mar. 29, 2016).
Chinese Patent Office, The First Office Action in Chinese Patent Application No. 201280058791.2 (dated Dec. 3, 2015).
DIC Color Design, Inc., "XYZ Color System" (2015) [obtained at http://www.dic-color.com/knowledge/xyz.html].
Japan Industrial Standard (JIS) Z 8701, "Color Display Method by XYZ Color System and $X_{10}Y_{10}Z_{10}$ Color System," Specification of Colours According to the CIE 1931—Standard Colorimetric System and the CIE 1964—Supplementary Standard Colorimetric System, pp. 111-119 (1982).
Kato, *Jour. Geol. Soc.* Japan, 107(1): 64-67 (Jan. 2001).
Kirk-Othmer, *Concise Encyclopedia of Chemical Technology*, "Film and Sheeting Materials," p. 1159 (1988).
Ministry of Internal Affairs and Communications, *Japan Standard Industrial Classification*, "Manufacturing industries of plastic films, sheets, floor materials, and artificial leather," item 182 (revised Oct. 2013—enforced Apr. 1, 2014).
Nagatsuka et al., *Nitto Technical Journal*, 27(1): 46-53 (May 1989).
Japanese Patent Office, Notice of Dispatch for Duplicate Patent Opposition in Japanese Opposition No. 2016-700225, Dispatch No. 042937, in Japanese Patent 5789564 (dated May 13, 2016).
Japanese Patent Office, Notice of Dispatch for Duplicate Patent Opposition in Japanese Opposition No. 2016-700225, Dispatch No. 042941, in Japanese Patent 5789564 (dated May 13, 2016).
Japanese Patent Office, Notification of Reasons for Refusal (Office Action) in Japanese Patent Application No. 2012-284081 (dated Aug. 2, 2016).
Japanese Patent Office, International Search Report in International Patent Application No. PCT/JP2016/056336 (dated May 10, 2016).
Japanese Patent Office, International Search Report in International Patent Application No. PCT/JP2016/059301 (dated Jun. 14, 2016).
Japanese Patent Office, Notification of Reasons for Refusal in Japanese Patent Application No. 2012-284048 (dated Jun. 14, 2016).
Japanese Patent Office, Notification of Reasons for Refusal in Japanese Patent Application No. 2012-284049 (dated Jul. 5, 2016).
Chinese Patent Office, The Fourth Office Action in Chinese Patent Application No. 201180030818.2 (dated Nov. 2, 2016).
European Patent Office, Communication Pursuant to Article 94(3) EPC, in European Patent Application No. 11798082.1 (dated Nov. 14, 2016).
European Patent Office, Communication Pursuant to Article 94(3) EPC, in European Patent Application No. 14186320.9 (dated Nov. 14, 2016).
Japanese Patent Office, Notification of Reasons for Refusal in Japanese Patent Application No. 2013-027736 (dated Nov. 22, 2016).
Japanese Patent Office, Notification of Reasons for Refusal in Japanese Patent Application No. 2013-027743 (dated Nov. 22, 2016).
Japanese Patent Office, Notification of Reasons for Refusal in Japanese Patent Application No. 2013-027750 (dated Nov. 22, 2016).
Japanese Patent Office, Notification of Reasons for Refusal in Japanese Patent Application No. 2013-027754 (dated Nov. 22, 2016).
Japanese Patent Office, Notification of Reasons for Refusal in Japanese Patent Application No. 2013-027755 (dated Nov. 22, 2016).
Japanese Patent Office, Notification of Reasons for Refusal in Japanese Patent Application No. 2013-028290 (dated Nov. 22, 2016).
Japanese Patent Office, Notification of Reasons for Refusal in Japanese Patent Application No. 2013-027738 (dated Nov. 29, 2016).
Japanese Patent Office, Notification of Reasons for Refusal in Japanese Patent Application No. 2013-028157(dated Nov. 29, 2016).
Japanese Patent Office, Notification of Reasons for Refusal in Japanese Patent Application No. 2013-028161(dated Nov. 29, 2016).
Japanese Patent Office, Notification of Reasons for Refusal in Japanese Patent Application No. 2013-551788 (dated Dec. 6, 2016).
Japanese Patent Office, Notification of Reasons for Refusal in Japanese Patent Application No. 2013-028271 (dated Dec. 20, 2016).

(56) References Cited

OTHER PUBLICATIONS

Japanese Patent Office, Notification of Reasons for Refusal in Japanese Patent Application No. 2013-028349 (dated Dec. 20, 2016).
Japanese Patent Office, Notification of Reasons for Refusal in Japanese Patent Application No. 2013-028365 (dated Dec. 20, 2016).
Japanese Patent Office, Notification of Reasons for Refusal in Japanese Patent Application No. 2013-028378 (dated Dec. 20, 2016).
Japanese Patent Office, Notification of Reasons for Refusal in Japanese Patent Application No. 2013-253161 (dated Dec. 20, 2016).
Japanese Patent Office, Notification of Reasons for Refusal in Japanese Patent Application No. 2014-006636 (dated Dec. 20, 2016).
Japanese Patent Office, Notification of Reasons for Refusal in Japanese Patent Application No. 2014-017181 (dated Dec. 27, 2016).
Japanese Patent Office, Notification of Reasons for Refusal in Japanese Patent Application No. 2016-063353 (dated Dec. 27, 2016).
Japanese Patent Office, Notification of Reasons for Refusal in Japanese Patent Application No. 2013-028384 (dated Jan. 4, 2017).
Japanese Patent Office, Notification of Reasons for Refusal in Japanese Patent Application No. 2013-181235 (dated Jan. 10, 2017).
Japanese Patent Office, Notification of Reasons for Refusal in Japanese Patent Application No. 2013-253159 (dated Jan. 10, 2017).
Chinese Patent Office, Third Office Action in Chinese Patent Application No. 201280024048.5 (dated Oct. 17, 2016).
Japanese Patent Office, International Search Report in International Patent Application No. PCT/JP2016/070384 (dated Sep. 20, 2016).
Japanese Patent Office, Notification of Reasons for Refusal in Japanese Patent Application No. 2013-023667 (dated Oct. 4, 2016).
Japanese Patent Office, Notification of Reasons for Refusal in Japanese Patent Application No. 2013-027735 (dated Oct. 4, 2016).
Japanese Patent Office, Notification of Reasons for Refusal in Japanese Patent Application No. 2013-028260 (dated Oct. 4, 2016).
Japanese Patent Office, Notification of Reasons for Refusal in Japanese Patent Application No. 2013-028263 (dated Oct. 4, 2016).
Japanese Patent Office, Notice of Reasons for Revocation in Japanese Japanese Patent No. 5789564 (dated Oct. 26, 2016).
Japanese Patent Office, Notification of Reasons for Refusal in Japanese Patent Application No. 2013-027745 (dated Nov. 15, 2016).
Japanese Patent Office, Notification of Reasons for Refusal in Japanese Patent Application No. 2013-028054 (dated Nov. 15, 2016).
Japanese Patent Office, Notification of Reasons for Refusal in Japanese Patent Application No. 2013-028062 (dated Nov. 15, 2016).
Japanese Patent Office, Notification of Reasons for Refusal in Japanese Patent Application No. 2012-284085 (dated Sep. 6, 2016).
Japanese Patent Office, Notification of Reasons for Refusal in Japanese Patent Application No. 2013-060416 (dated Jan. 17, 2017).
Japanese Patent Office, Notification of Reasons for Refusal in Japanese Patent Application No. 2013-103941 (dated Jan. 17, 2017).
Japanese Patent Office, Notification of Reasons for Refusal in Japanese Patent Application No. 2014-012284 (dated Jan. 17, 2017).
Japanese Patent Office, Notification of Reasons for Refusal in Japanese Patent Application No. 2013-102468 (dated Jan. 24, 2017).
Japanese Patent Office, Notification of Reasons for Refusal in Japanese Patent Application No. 2013-103844 (dated Jan. 24, 2017).
Japanese Patent Office, International Search Report in International Patent Application No. PCT/JP2016/084524 (dated Jan. 31, 2017).
Japanese Patent Office, Notification of Reasons for Refusal in Japanese Patent Application No. 2013-105035 (dated Feb. 14, 2017).
European Patent Office, Extended European Search Report in European Patent Application 12785180.6 (dated Jan. 30, 2015).
European Patent Office, Extended European Search Report in European Patent Application 14186320.9 (dated Dec. 22, 2014).
Hartlove, "Quantum Dots Unleash High Color Gamut Performance in LED-Backlit Displays," *LEDs Magazine Japan*, pp. 14-16 (Dec. 2011).
Olympus Corporation, "Series II: Basis of Polarization Analysis," obtained from Olympus Corporation website (Jul. 13, 2009).
Saito, "Illustrated Basis of Optics," *Electronics Series*, First Edition, Nikkan Kogyo Shimbun Ltd. (publisher), pp. 154-157 (Nov. 25, 2011).
Japanese Patent Office, Notification of Reasons for Refusal in Japanese Patent Application No. 2012-174966 (dated Apr. 26, 2016).
Japanese Patent Office, Notification of Reasons for Refusal in Japanese Patent Application No. 2012-198500 (dated May 10, 2016).
Japanese Patent Office, Notification of Reasons for Refusal in Japanese Patent Application No. 2012-171990 (dated Oct. 4, 2016).
Japanese Patent Office, Notification of Reasons for Refusal in Japanese Patent Application No. 2012-174966 (dated Nov. 29, 2016).
Japanese Patent Office, Notification of Reasons for Refusal in Japanese Patent Application No. 2012-198500 (dated Jan. 24, 2017).
Japanese Patent Office, Notification of Reasons for Refusal in Japanese Patent Application No. 2016-063352 (dated Jan. 31, 2017).
Japanese Patent Office, Notification of Reasons for Refusal in Japanese Patent Application No. 2012-284081 (dated Mar. 7, 2017).
Japanese Patent Office, Notification of Reasons for Refusal in Japanese Patent Application No. 2013-106236 (dated Mar. 14, 2017).
Korean Patent Office, Notification of Reasons for Refusal in Korean Patent Application No. 10-2016-7031805 (dated Mar. 20, 2017).
Chinese Patent Office, The First Office Action in Chinese Patent Application No. 201480027949.9 (dated Jun. 2, 2017).
Japanese Patent Office, International Search Report in International Patent Application No. PCT/JP2017/011981 (dated Jun. 6, 2017).
Ukai, "Introduction to Flat Panel Display (6) FPD to Components and Materials Technology (1) Touch Panel," *The Chemical Times*, 2011(4): 2-7 (2011).
Fukuda et al., "New Green-Emitting Sialon-Based Phosphor for White LEDs," *Toshiba Review*, 64(4): 60-63 (2009).
Japanese Patent Office, Notice on Information Offer Form in Japanese Patent Application No. 2011-160702 (dated Jan. 29, 2013).
Japanese Patent Office, Notification of Reasons for Refusal in Japanese Patent Application No. 2013-106235 (dated Dec. 20, 2016).
U.S. Appl. No. 13/509,211, filed May 10, 2012.
U.S. Appl. No. 13/806,023, filed Dec. 20, 2012.
U.S. Appl. No. 14/118,169, filed Nov. 15, 2013.
Kikutani et al., "Methods of Birefringence Measurement and Examples of Data Analysis," *Seni Gakkaishi*, 66(1): 39-44 (2010).
Japanese Patent Office, Notification of Reasons for Refusal for Japanese Patent Application No. 2013-228154 (dated Mar. 27, 2018).
Japanese Patent Office, Notification of Reasons for Refusal for Japanese Patent Application No. 2017-127016 (dated Mar. 20, 2018).
Yamaoka (editor-in-chief), Dictionary of Optical Application Technologies and Materials, p. 362 ("Phase difference/protective film integrated polarizing plate (Fig. 5.1.17)") (Sangyo-Gijutsu Service Center Co., Ltd. (publishing company), 2006).
Japanese Patent Office, Notification of Reasons for Refusal in Japanese Patent Application No. 2017-157901 (dated Jul. 3, 2018).

(56) References Cited

OTHER PUBLICATIONS

Japanese Patent Office, Decision of Refusal in Japanese Patent Application No. 2014-543689 (dated Apr. 24, 2018).

Japanese Patent Office, Notification of Reasons for Refusal in Japanese Patent Application No. 2014-228945 (dated Aug. 28, 2018).

Olympus Corporation, "Learn More About Microscopes/Learn about polarizing microscopes from the basics/2nd Issue: Basic Polarization Analysis," pp. 3-4 [downloaded from http://microscopelabo.jp/learn/009/index_2.html] (Mar. 1, 2017).

Yasue, "Chapter 8: Polarization," Feynman Physics II (published by Iwanami Shoten), 32nd revision, pp. 87-90 (Feb. 5, 1996).

Japanese Patent Office, Office Action in Japanese Patent Application No. 2013-027749 (dated Aug. 28, 2018).

Japanese Patent Office, Decision of Refusal in Japanese Patent Application No. 2014-525242 (dated Sep. 18, 2018).

Japanese Patent Office, Report of Consideration by Examiner before Appeal in Appeal No. 2018-010109 in Japanese Patent Application No. 2014-543689 (dated Oct. 30, 2018).

Japanese Patent Office, Report of Reconsideration by Examiner before Appeal in Appeal No. 2018-012616 for Japanese Patent Application No. 2016-239613 (Nov. 6, 2018).

Japanese Patent Office, Notification of Reasons for Refusal in Japanese Patent Application No. 2018-001046 (dated Nov. 20, 2018).

\* cited by examiner

POLARIZING PLATE SUITABLE FOR LIQUID CRYSTAL DISPLAY DEVICE CAPABLE OF DISPLAYING THREE-DIMENSIONAL IMAGES, AND LIQUID CRYSTAL DISPLAY DEVICE

CROSS-REFERENCE TO RELATED APPLICATION(S)

This patent application is the U.S. national phase of International Patent Application No. PCT/JP2012/062476, filed May 16, 2012, which claims the benefit of Japanese Patent Application No. 2011-111023, filed on May 18, 2011, each of which is incorporated by reference in its entirety herein.

TECHNICAL FIELD

The present invention relates to a polarizer (polarizing plate) and a liquid crystal display device. More specifically, the present invention relates to a polarizer suitable for a liquid crystal display device that is capable of displaying three-dimensional images and that has such excellent visibility that when the screen displayed on the liquid crystal display device is viewed through a polarizing filter, the screen brightness does not become zero, regardless of the angle of the position of the polarization axis of the polarizing filter in the clockwise direction in front of the screen; and a liquid crystal display device using the polarizer.

BACKGROUND ART

Stereoscopic 3D images are visible in such a manner that images prepared for the left eye and the right eye are viewed separately by the left and right eyes of an individual, so that the images are recognized as a three-dimensional image. Various 3D display technologies have been proposed, and they largely fall into two types: those that require special glasses, and those that are visible with the naked eye. A classical type of special glasses uses color filters, while special glasses currently proposed use wavelength selection filters or polarizing filters. The method using a polarizing filter includes, for example, an active system and a passive system. The active system is also called a time-division method, in which images for the left and right eyes are sequentially displayed in a time-division manner, and a viewer views the images through special glasses with polarizing filters that are opened and closed in synchronization with the switching of the images, so that the images are recognized as a three-dimensional image. On the other hand, the passive system is a way to show images for the left and right eyes by two orthogonal polarized light beams or circularly-polarized light beams with different directions of polarization on the left and right sides, and filter the images through special glasses with polarizing filters having orthogonal polarization axes on the left and right sides or with circular polarizations having different directions of polarization, so that the images are recognized as a stereoscopic image. Such 3D images can be provided not only in movies, but also in various displays, such as liquid crystal display devices (NPL 1).

In contrast, liquid crystal display (LCD) devices display images in such a manner that a liquid crystal cell, which is controlled to be on or off by a change in voltage, controls light passing through two polarizers. A liquid crystal display device comprises, as main components, a backlight light source, two polarizers, and a liquid crystal cell disposed between the two polarizers, and optionally comprises various optical functional films, such as a lens sheet and diffusion sheet.

A polarizer, which is a constituent member of an LCD, has a characteristic of selectively allowing only polarized light amplified in a specific direction to pass through. Accordingly, the light emitted from the LCD is polarized. A polarizer generally comprises a polarizing film made of stretched polyvinyl alcohol (PVA) and a dichromatic dye, such as iodine, and protective films that protect both sides of the polarizing film. In terms of optical characteristics, tri-acetyl cellulose films (TAC films) that are not affected by polarization and do not have birefringence have been mainly used as the protective films. Along with the recent trend toward thinner LCDs, there is a demand for reducing the thickness of the polarizers. However, when the thickness of a TAC film is reduced, problems such as insufficient mechanical strength and deteriorated moisture permeability occur. Moreover, since TAC films are very expensive, inexpensive alternative materials are strongly desired.

Accordingly, in order to reduce the thickness of the polarizers, there is a proposal to use oriented films made of a polyester resin or a polycarbonate resin as protective films in place of TAC films, so that high durability can be maintained even though the thickness of the films is low (PTL 1 to PTL 3). These oriented films have excellent mechanical strength and durability, but have birefringence, unlike TAC films. When polarized light passes through a film having birefringence, optical deformation occurs, and consequently brightness is likely to be reduced. For this reason, when an oriented film and a polarizing film were laminated to form a polarizer, it was necessary to laminate the oriented film and the polarizing film so that the orientation axis of the oriented film was parallel to the polarization axis of the polarizing film, in terms of preventing a decrease in brightness or reducing variations in the polarization state due to birefringence (PTL 3).

CITATION LIST

Patent Literature

PTL 1: JP2004-205773A
PTL 2: JP2005-266464A
PTL 3: JP2010-277028A

Non-Patent Literature

NPL 1: Kenji ISHIKAWA, "3D Stereoscopic Images Are Coming," Ohmsha Ltd., Apr. 25, 2010, pp. 62-118

SUMMARY OF INVENTION

Technical Problem

Light emitted from a liquid crystal display device has a bias in a specific amplitude direction. Accordingly, when a liquid crystal display device capable of displaying three-dimensional images is viewed through a polarizing filter (e.g., polarized glasses), the direction of the polarization axis of the polarizing filter is designed to be parallel to the polarization axis of the polarizer of the liquid crystal display device so that the screen brightness becomes the maximum when the liquid crystal display device is viewed from the front. This structure caused the following problem. That is, when a viewer in a lying posture views the screen, the direction of the polarization axis of the polarizing filter is orthogonal to the polarization axis of the liquid crystal display device, and the brightness of light passing through the polarizing filter becomes zero, consequently making the display image invisible.

Furthermore, when a liquid crystal display device was produced by using an oriented film as a protective film, rainbow-like color unevenness (hereinafter sometimes abbreviated as "rainbow unevenness") occurred when an image displayed on the screen was observed from an oblique direction, causing deterioration in image quality.

The present invention was made to solve these problems. A primary object of the present invention is to provide a polarizer for a liquid crystal display device capable of displaying three-dimensional images, whereby the brightness of light passing through a polarizing filter disposed so that the polarization axis of the polarizing filter is parallel to the polarization axis of the liquid crystal display device does not significantly decrease, and the brightness of light passing through a polarizing filter disposed so that the polarization axis of the polarizing filter is orthogonal to the polarization axis of the liquid crystal display device is sufficient for viewing the images; and also to provide such a liquid crystal display device and members thereof. Another object of the present invention is to provide a polarizer for providing a liquid crystal display device capable of displaying three-dimensional images, whereby the occurrence of rainbow unevenness is suppressed; and also provide such a liquid crystal display device and members thereof.

Solution to Problem

The present inventors have intensively studied to attain the above objects, and as a result, they have surprisingly found that the primary object can be achieved by bonding an oriented film and a polarizing film so that the orientation axis of the oriented film or an axis orthogonal to the orientation axis and the polarization axis of the polarizing film are adjusted to have a predetermined tilt, contrary to conventional common technical knowledge. As a result of further studies, the present inventors found that the other object can be achieved by using, as the above-mentioned oriented film, an oriented film having a predetermined retardation, and white light-emitting diodes as the light source.

The present invention has been completed upon further modification based on these findings. Typical aspects of the present invention are shown below.

(1) A polarizer comprising a polarizing film and protective films disposed on both sides of the polarizing film,
wherein at least one of the protective films is an oriented film, and
wherein the tilt of the orientation axis of the oriented film or an axis orthogonal to the orientation axis relative to the polarization axis of the polarizing film being 1° or more and less than 45°.

(2) The above polarizer, wherein the oriented film is made of a polyester resin or a polycarbonate resin.

(3) The above polarizer, wherein the oriented film has a retardation of 3,000 to 30,000 nm.

(4) The above polarizer, wherein the oriented film has a ratio of retardation to thickness-direction retardation (Re/Rth) of 0.2 to 1.2.

(5) The above polarizer, wherein the oriented film comprises at least three layers, contains an ultraviolet absorber in the layer other than the outermost layers, and has a light transmittance at 380 nm of 20% or less.

(6) A liquid crystal display device comprising a backlight light source, two polarizers, and a liquid crystal cell disposed between the two polarizers,
wherein at least one of the polarizers is the polarizer according to any one of (1) to (5).

(7) A liquid crystal display device comprising a backlight light source, two polarizers, and a liquid crystal cell disposed between the two polarizers,
wherein the polarizer on the viewing side of the liquid crystal cell is the above polarizer; and
wherein at least the protective film on the viewing side of the polarizer on the viewing side is the oriented film.

(8) The above liquid crystal display device, wherein the backlight light source is a white light-emitting diode.

(9) The above liquid crystal display device for making a three-dimensional image visible through a polarizing filter.

Advantageous Effects of Invention

When the polarizer of the present invention is used to form a liquid crystal display device for displaying three-dimensional images, at least the following effects (1) and (2) are obtained.

(1) When a polarizing filter commonly used by a viewer is disposed so that the polarization axis of the polarizing filter is parallel to the polarization axis of a polarizing film on the viewing side of the liquid crystal display device, the brightness of light emitted from the liquid crystal display device and passing through the polarizing filter does not significantly decrease, as compared to when a conventional polarizer is used.

(2) When the polarizing filter is disposed so that the polarization axis of the polarizing filter is orthogonal to the polarization axis of the polarizing film, light emitted from the liquid crystal display device and passing through the polarizing filter has sufficient brightness for making three-dimensional images visible.

Therefore, the use of a liquid crystal display device for three-dimensional image display using the polarizer of the present invention allows a viewer wearing a polarizing filter to enjoy three-dimensional images that are substantially as clear as conventional three-dimensional images when the viewer views the liquid crystal display screen in a posture such that the polarization axis of the filter is parallel to the polarization axis of the polarizing film. The viewer can also enjoy three-dimensional images when the viewer views the liquid crystal display screen in a posture such that the polarization axis of the polarizing filter is orthogonal to the polarization axis of the polarizing film.

The conventional polarizer as mentioned herein is one using, as the protective film of the polarizing film, a non-oriented film or an oriented film in which the orientation axis of the oriented film or an axis orthogonal to the orientation axis is parallel to the polarization axis of the polarizing film. The "axis orthogonal to the orientation axis of the oriented film" is appropriately abbreviated as the "orthogonal axis" hereinafter.

Moreover, when the preferred polarizer of the present invention is used to form a liquid crystal display device comprising white light-emitting diodes as a light source, the occurrence of rainbow unevenness can be suppressed when the liquid crystal display screen is viewed from any direction through a polarizing filter. Accordingly, the use of the preferred polarizer of the present invention makes images visible from any direction, without allowing rainbow unevenness to impede recognition of the precise images.

DESCRIPTION OF EMBODIMENTS

The polarizer of the present invention comprises a polarizing film and protective films disposed on both sides of the polarizing film, and is characterized in that at least one of the protective films is an oriented film, and that the tilt of the orientation axis or orthogonal axis of the oriented film relative to the polarization axis of the polarizing film is 1° or more and less than 45°. Comprising protective films on both sides of the polarizing film means that the protective films are laminated on both sides of the polarizing film.

According to conventional common technical knowledge, when an oriented film is used as a protective film of a polarizing film, the polarizing film and the oriented film are bonded to each other so that the polarization axis of the polarizing film is parallel to the orientation axis of the oriented film, in terms of preventing a reduction in brightness and optical deformation. In contrast, the polarizer of the present invention has a structure in which a polarizing film and an oriented film are bonded to each other so that the polarization axis of the polarizing film and the orientation axis of the oriented film are not parallel to each other, but are inclined to each other at an angle of 1° or more and less than 45°. Producing a liquid crystal display device for displaying three-dimensional images using a polarizer having such a structure makes it possible to enjoy three-dimensional images that are substantially as clear as conventional images, when the liquid crystal display screen is viewed through a polarizing filter disposed at an angle at which the orientation axis of the polarizing filter is parallel to the polarization axis of the polarizing film of the polarizer. Even when the liquid crystal display screen is viewed through a polarizing filter disposed at an angle outside of the above angle (e.g., an angle tilted 90° from the above angle), light with sufficient brightness for enjoying three-dimensional images passes through the polarizing filter. Although not wishing to be bound by any theory, the present inventor considers the principle of providing such effects to be as follows.

Light emitted from a liquid crystal display device is polarized due to the influence of polarizers, particularly the polarizer disposed on the viewing side of a liquid crystal cell. When a viewer observes the liquid crystal display screen through a polarizing filter to see three-dimensional images, the brightness of light emitted from the liquid crystal display device and passing through the polarizing filter becomes zero when the polarization axis of the polarizing filter is orthogonal to the polarization axis of the light. In contrast, when the polarizer of the present invention is used, optically moderate conversion (conversion of the polarization direction distribution) can be imparted to the polarized light emitted from the liquid crystal display device, due to the influence of the oriented protective film having birefringence. Therefore, even if the polarization axis of the polarizing filter worn by the viewer is orthogonal to the polarization axis of the polarizing film disposed on the viewing side of the liquid crystal cell, the polarization axis of the emitted light is not completely orthogonal to the polarization axis of the polarizing filter, and visible screen brightness can be ensured. Such an optical conversion effect of the oriented film cannot be obtained when the polarization axis of the polarizing film is parallel to the orientation axis or orthogonal axis of the oriented film. The effect can be achieved when the polarization axis of the polarizing film and the orientation axis of the oriented film have an angle of 1° or more and less than 45°, or when the orthogonal axis of the oriented film and the polarization axis of the polarizing film intersect with each other at an angle of 1° or more and less than 45°.

In the polarizer of the present invention, the tilt of the orientation axis or orthogonal axis of the oriented film relative to the polarization axis of the polarizing film is 1° or more, preferably 2° or more, more preferably 3° or more, even more preferably 4° or more, still even more preferably 5° or more, and particularly preferably 7° or more. When the tilt of the orientation axis of the oriented film relative to the polarization axis of the polarizing film is greater than the above lower limit, the optical conversion effect of the oriented film can be preferably achieved. Surprisingly, the same effect can also be achieved when the tilt of the orthogonal axis of the oriented film relative to the polarization axis of the polarizing film is greater than the above lower limit. The direction of the orientation axis of the oriented film can be measured by a molecular orientation analyzer.

When a liquid crystal display device for displaying three-dimensional images is produced by using the polarizer of the present invention, controlling the tilt of the orientation axis or orthogonal axis of the oriented film relative to the polarization axis of the polarizing film within the above range allows light emitted from the liquid crystal display device and passing through a polarizing filter to have sufficient brightness for making three-dimensional images visible when the polarizing filter is disposed so that the polarization axis of the polarizing filter is orthogonal to the polarization axis of the polarizing film. The notion that "the light passing through the polarizing filter has sufficient brightness for making three-dimensional images visible" as mentioned herein indicates that the increase rate (%) of brightness determined by the following formula is 0.1% or more, preferably 1% or more, more preferably 3% or more, and even more preferably 5% or more, as shown in Examples, described later.

$$\begin{aligned}\text{Increase rate} \\ (\%) = {}&[(\text{brightness in the orthogonal state when using the polarizer} \\ &\text{of the present invention}) - (\text{brightness in the} \\ &\text{orthogonal state when using a conventional polarizer})]/ \\ &(\text{brightness in the parallel state when using a} \\ &\text{conventional polarizer}) \times 100\end{aligned}$$

In this formula, the "brightness in the orthogonal state when using the polarizer of the present invention" is the brightness of light emitted from a liquid crystal display device, which comprises the polarizer of the present invention as a polarizer on the viewing side, and passing through a polarizing filter disposed so that its polarization axis is orthogonal to the polarization axis of the polarizing film of the polarizer ("its polarization axis" refers to the polarization axis of the polarizing filter). That is, the "brightness in the orthogonal state" is the brightness of light emitted from the polarizer and passing through a polarizing filter disposed so that the polarization axis of the polarizing filter is orthogonal to the polarization axis of the polarizing film of the polarizer on the viewing side.

The "brightness in the orthogonal state when using a conventional polarizer" is the brightness of light in the orthogonal state when a conventional polarizer, which has a structure in which a polarizing film and an oriented film are bonded to each other so that the polarization axis of the polarizing film is parallel to the orientation axis of the oriented film, is employed as a polarizer on the viewing side. That is, the "brightness in the orthogonal state when using a conventional polarizer" is the brightness of light emitted from a conventional polarizer and passing through a polarizing filter disposed so that the polarization axis of the polarizing filter is orthogonal to the polarization axis of the polarizing film of the polarizer.

The "brightness in the parallel state when using a conventional polarizer" is the brightness of light emitted from a conventional polarizer and passing through a polarizing filter disposed so that its polarization axis is parallel to the polarization axis of the polarizing film of the polarizer ("its polarization axis" refers to the polarization axis of the polarizing filter).

When the tilt of the orientation axis or orthogonal axis of the oriented film relative to the polarization axis of the polarizing film becomes larger (approaching 45°), brightness when a viewer observes the screen in a normal posture (in a state where the polarization axis of a polarizing filter worn by the viewer is parallel to the polarization axis of a polarizing film disposed on the viewing side of a liquid crystal device) (i.e., front brightness in the normal posture) decreases. Hence, the tilt of the orientation axis of the oriented film relative to the polarization axis of the polarizing film is preferably less than 45°. Viewers view a liquid crystal display device mostly in the normal posture, and less often view it in a lying posture (in the state of lying down). The ratio of normal posture and lying posture is considered to be about 8:2 to 9:1. Accordingly, in order not to make brightness in the lying posture zero, without substantially reducing the front brightness in the normal posture, the angle between the polarization axis of the polarizing film and the orientation axis or orthogonal axis of the oriented film is less than 45°, preferably 40° or less, more preferably 30° or less, even more preferably 20° or less, still more preferably 15° or less, and even still more preferably 10° or less. Controlling the upper limit of the tilt as described above can more preferably balance the entire visibility in consideration of the viewing posture.

Controlling the tilt of the orientation axis or orthogonal axis of the oriented film relative to the polarization axis of the polarizing film within the above range has the following effect. That is, when a polarizing filter commonly worn by a viewer is disposed so that the polarization axis of the polarizing filter is parallel to the polarization axis of a polarizing film of a liquid crystal display device, the brightness of light emitted from the liquid crystal display device and passing through the polarizing filter does not significantly decrease, as compared to when a conventional polarizer is used. The notion that "the brightness does not significantly decrease, as compared to when a conventional polarizer is used" as mentioned herein indicates that the brightness retention rate (%) is 58% or more, preferably 65% or more, more preferably 70% or more, even more preferably 80% or more, and still more preferably 90% or more, as shown in Examples, described later.

Retention rate (%)=(brightness in the parallel state when using the polarizer of the present invention)/(brightness in the parallel state when using a conventional polarizer)×100

In this formula, the "brightness in the parallel state when using the polarizer of the present invention" is the brightness of light emitted from a liquid crystal display device using the polarizer of the present invention as a polarizer on the viewing side, and passing through a polarizing filter disposed so that its polarization axis is parallel to the polarization axis of the polarizing film of the polarizer ("its polarization axis" refers to the polarization axis of the polarizing filter). The "brightness in the parallel state when using a conventional polarizer" is the brightness of light emitted from a liquid crystal display device using the conventional polarizer as a polarizer on the viewing side, and passing through a polarizing filter disposed so that its polarization axis is parallel to the polarization axis of the polarizing film of the polarizer.

In a preferred embodiment, the polarizer of the present invention preferably comprises an oriented film having a retardation of 3,000 to 30,000 nm as at least one of the protective films. A liquid crystal display device formed by using a polarizer comprising an oriented film having such a retardation as a protective film makes it possible to suppress the occurrence of rainbow unevenness on the screen when an image displayed on the liquid crystal display device is viewed through a polarizing filter. In particular, when a polarizer comprising an oriented film having such a specific retardation as a protective film of a polarizing film is used as at least a polarizer on the viewing side of a liquid crystal display device, the occurrence of rainbow unevenness can be effectively suppressed when the screen is viewed from the front through a polarizing filter.

If an oriented film having a retardation of less than 3,000 nm is used as a protective film, rainbow unevenness may occur when the screen is viewed from the front. In addition, a strong interference color is presented when observed from an oblique direction. This makes the envelope curve shape dissimilar to the emission spectrum of the light source; therefore, excellent visibility may not be ensured. From such a viewpoint, the lower limit of the retardation is preferably 4,000 nm, more preferably 4,500 nm, and still more preferably 5,000 nm. However, even if the retardation is 3,000 nm or more, rainbow unevenness may occur when the screen is observed from an oblique direction through a polarizing filter. Thus, in terms of more effectively suppressing rainbow unevenness when the screen is observed from an oblique direction, it is preferable that the oriented film used as the protective film of the polarizer of the present invention further satisfy a specific Re/Rth ratio, as described above.

On the other hand, the upper limit of the retardation is 30,000 nm. An oriented film having a retardation of higher than 30,000 nm is not preferred. This is because the use of such an oriented film cannot substantially attain the effect of further improving visibility, while also leading to a considerable increase in the thickness of the film. This reduces the handling ability of the film as an industrial material. From such a viewpoint, the upper limit of the retardation is more preferably 25,000 nm, still more preferably 20,000 nm, and even still more preferably 15,000 nm. In the present invention, the retardation can be determined by measuring refractive indices in two mutually orthogonal directions and thickness, or can be measured by a commercially available automatic birefringence analyzer, such as RETS-100 (Otsuka Electronics Co., Ltd.).

An oriented film having a retardation of 3,000 to 30,000 nm may be used as a protective film on one side or both sides of a polarizing film. When an oriented film having a retardation of 3,000 to 30,000 nm is used on only one side of a polarizing film, the polarizing film is preferably disposed in the liquid crystal display device so that the side to which the oriented film is applied is located on the viewing side. When an oriented film having a retardation of 3,000 to 30,000 nm is used as a protective film on only one side of a polarizing film, a non-oriented or low-retardation film, typified by triacetyl cellulose films (TAC films), acrylic films, and norbornene films, can be used as a protective film on the other side of the polarizing film.

A liquid crystal display device generally comprises two polarizers on both sides of a liquid crystal cell. Both or either of the polarizers may be the polarizer of the present invention. When the polarizer of the present invention is used as only one of the two polarizers, it is preferable to use the polarizer of the present invention as the polarizer located on the viewing side of the liquid crystal cell.

Although not wishing to be bound by any theory, the present inventors consider the mechanism of the occurrence of rainbow unevenness and the principle of suppressing rainbow unevenness by the present invention as follows.

The present inventors analyzed factors causing rainbow unevenness, and found that the occurrence of rainbow unevenness was attributable to the retardation of the oriented film and the emission spectrum of the backlight light source. Conventionally, fluorescent tubes, such as cold-cathode tubes and hot-cathode tubes, are used as backlight light sources of liquid crystal display devices. The spectral distribution of fluorescent lamps, such as cold-cathode tubes and hot-cathode tubes, shows emission spectra having a plurality of peaks. These discontinuous emission spectra are combined to provide a white light source. When an oriented film having a retardation transmits light, transmission intensity varies depending on the wavelength of the light. Accordingly, when the backlight light source has discontinuous emission spectra, only light of a specific wavelength is intensively transmitted, presumably leading to the occurrence of rainbow unevenness depending on the observation angle.

In order to suitably suppress the occurrence of rainbow unevenness depending on the observation angle, it is preferable to use a specific backlight light source in combination with an oriented film having a specific retardation. The structure of the backlight light source may be an edge-light system comprising a light guide plate, a reflector, etc., as components, or a direct under-light system; however, it is preferable to use white light-emitting diodes (white LEDs) as the backlight light source of the liquid crystal display device. The white LEDs refer to organic light-emitting diodes (OLEDs), or phosphor-based devices, that is, devices that emit white light by the combined use of phosphors with light-emitting diodes using compound semiconductors to emit blue light or ultraviolet light. Among phosphors, white light-emitting diodes comprising light-emitting devices obtained by the combined use of yttrium-aluminum-garnet yellow phosphors with blue light-emitting diodes using compound semiconductors are suitable as the backlight light source of the present invention because of their continuous and wide emission spectrum and excellent luminous efficiency. Moreover, organic light-emitting diodes are also suitable because of their continuous and wide emission spectrum. A continuous and wide emission spectrum means that the emission spectrum is continuous in the visible light range, and that there is no wavelength at which the light intensity of the emission spectrum is zero, at least in a wavelength region of 450 to 650 nm.

In a preferable embodiment of the liquid crystal display device of the present invention, white LEDs, which consume low power, are used; therefore, it can attain the effect of energy conservation.

When an oriented film having birefringent properties is disposed on one side of the polarizing film, linearly polarized light emitted from the polarizing film is disturbed when passing through a birefringent material. The transmitted light shows an interference color specific to the retardation of the oriented film, which is the product of the birefringence and the thickness thereof. Accordingly, when cold-cathode tubes, hot-cathode tubes, or the like that have discontinuous emission spectra are used as the light source, the intensity of the transmitted light varies depending on the wavelength, causing rainbow unevenness.

In contrast, white light-emitting diodes have a continuous and wide emission spectrum in the visible light region. Therefore, when focusing on the envelope curve shape of the interference color spectrum of light transmitted through a birefringent material, a spectrum similar to the emission spectrum of the light source can be obtained by controlling the retardation of the oriented film. It is thus considered that rainbow unevenness is not generated, and visibility is significantly improved, because the envelope curve shape of the interference color spectrum of the light transmitted through the birefringent material becomes similar to the emission spectrum of the light source.

As described above, when white light-emitting diodes having a wide emission spectrum are used as the light source, and a polarizer comprising an oriented film having the above specific retardation as at least one of protective films is employed, the envelope curve shape of the spectrum of the transmitted light can be approximated to the emission spectrum of the light source with only a relatively simple structure.

In the present invention, the material of the oriented film used as the protective film of the polarizing film is not limited as long as a film having orientation can be formed, and any material can be used. Examples thereof include polyester resins, such as polyethylene terephthalate and polyethylene naphthalate, polycarbonate resins, polystyrene resins, polyether ether ketone resins, polyphenylene sulfide resins, cycloolefin polymers, and the like. Among these, polycarbonate resins and polyester resins are preferable in terms of their excellent transparency, heat resistance, and mechanical strength.

Polycarbonate resins are polyesters of carbonate and glycol or dihydric phenol. Examples of polycarbonate resins usable in the present invention include aromatic polycarbonate comprising carbonate and 2,2'-bis(4-hydroxyphenyl)-propane (commonly known as bisphenol A) as structural units; as well as, for example, homo- or copolymerized polycarbonates comprising, as a monomer component, at least one dihydric phenol selected from the group consisting of 1,1-bis(4-hydroxyphenyl)-alkylcycloalkane, 1,1-bis(3-substituted-4-hydroxyphenyl)-alkylcycloalkane, 1,1-bis(3,5-substituted-4-hydroxyphenyl)-alkylcycloalkane, and 9,9-bis(4-hydroxyphenyl)fluorene; mixtures with polycarbonate comprising an aforementioned dihydric phenol as a monomer component and polycarbonate comprising bisphenol A as a monomer component; copolymerized polycarbonate comprising an aforementioned dihydric phenol and bisphenol A as monomer components; and the like.

A polycarbonate film can be produced by a known method, for example, in the following manner. A non-oriented sheet obtained by melting polycarbonate and extruding the molten polycarbonate into a sheet-like shape is stretched unidirectionally (or bidirectionally, if necessary) at a temperature higher than the glass transition temperature, thereby obtaining an oriented film. The non-oriented polycarbonate sheet may be a commercial product or produced by solution-film formation.

A polyester resin is obtained by polycondensation of a dicarboxylic acid component and a glycol component. Usable dicarboxylic acid components are terephthalic acid, isophthalic acid, naphthalene dicarboxylic acid, and the like. Usable glycol components are ethylene glycol, diethylene glycol, 1,4-butanediol, neopentyl glycol, and the like. In the present invention, preferred in terms of strength, transparency, etc., are polyethylene terephthalate and polyethylene naphthalate; and particularly preferred is polyethylene terephthalate. The polyester may contain other copolymerization components; however, in terms of mechanical strength, the proportion of copolymerization components is preferably as low as 3 mol % or less, more preferably 2 mol % or less, and even more preferably 1.5 mol % or less.

In the most general method for producing polyester films, for example, non-oriented polyester obtained by melting a polyester resin and extruding the molten resin into a sheet-like shape is stretched in a longitudinal direction through the use of roll velocity difference at a temperature higher than the glass transition temperature, and then stretched in a transverse direction with a tenter, followed by heat treatment.

The oriented film of the present invention (e.g., polyester film or polycarbonate film) may be a uniaxially stretched film or a biaxially stretched film, as long as the effect of the present invention is obtained.

The occurrence of rainbow unevenness is caused by the following factors: The biaxially stretched film has an index ellipsoid with different refractive indices in the running direction, width direction, and thickness direction, and there is a direction in which the retardation is zero (the index ellipsoid looks like a perfect circle) depending on the light transmission direction in the film. Accordingly, when the screen of the liquid crystal display is observed from a specific oblique direction, there may be a point at which the retardation is zero. Centering on that point, rainbow unevenness is generated in a concentric manner. When the angle between the position right above the film surface (normal direction) and the position at which rainbow unevenness is visible is regarded as θ, the angle θ becomes larger as the birefringence in the film plane increases, and rainbow unevenness is less likely to be visible. Since a biaxially stretched film tends to have a lower angle θ, a uniaxially stretched film, in which rainbow unevenness is less likely to be visible, is preferred.

However, a complete uniaxial (uniaxially symmetric) film is not preferred, because mechanical strength in a direction orthogonal to the orientation direction remarkably decreases. In the present invention, it is preferable to have biaxiality (biaxial symmetry) in a range where rainbow unevenness is not substantially generated, or in a range where rainbow unevenness is not generated within the range of the viewing angle required for liquid crystal display screens.

The difficulty in visibility of rainbow unevenness can be determined using, as an indicator, the difference between the retardation (in-plane retardation) and the thickness-direction retardation (Rth). A thickness-direction phase difference indicates the average of phase differences obtained by multiplying each of two birefringence values $\Delta Nxz$ and $\Delta Nyz$, when the film is viewed from the thickness-direction cross-section, by the film thickness d. The smaller the difference between the in-plane retardation and the thickness-direction retardation, the higher the isotropy of the action of birefringence depending on the observation angle. Thus, the variation of retardation depending on the observation angle is reduced. Accordingly, rainbow unevenness depending on the observation angle is presumably less likely to occur.

The ratio of retardation to thickness-direction retardation (Re/Rth) of the oriented film of the present invention is preferably 0.2 or higher, more preferably 0.5 or higher, and still more preferably 0.6 or higher. The greater the ratio of retardation to thickness-direction retardation (Re/Rth), the higher the isotropy of the action of birefringence, and the less rainbow unevenness depending on the observation angle occurs. A complete uniaxial (uniaxially symmetric) film has a ratio of retardation to thickness-direction retardation (Re/Rth) of 2.0.

On the other hand, the ratio of retardation to thickness-direction retardation (Re/Rth) of the oriented film of the present invention is preferably 1.2 or less, and more preferably 1 or less. In order to completely prevent the occurrence of rainbow unevenness depending on the observation angle, the above ratio of retardation to thickness-direction retardation (Re/Rth) is not necessarily 2.0, but is sufficiently 1.2 or less. Moreover, even if the above ratio is 1 or less, it is sufficiently possible to satisfy viewing-angle characteristics required for liquid crystal display devices (right/left viewing angle: about 180 degrees, and upper/lower viewing angle: about 120 degrees). Furthermore, an oriented film having a ratio of retardation to thickness-direction retardation (Re/Rth) of higher than 1.2 is not preferable, because such a film is likely to have lower durability and to easily tear and break. In terms of making the film less likely to tear or break, the oriented film used in the polarizer of the present invention preferably has a tear strength of 100 mN or more. The tear strength can be measured by the method shown in Examples, described later.

As described above, it is possible to control the retardation of the oriented film in a specific range by appropriately setting the stretch ratio, the stretch temperature, and the thickness of the film. For example, the higher the stretch ratio, the lower the stretch temperature, or the greater the thickness of the film, the more likely will a large retardation be obtained. In contrast, the lower the stretch ratio, the higher the stretch temperature, or the smaller the thickness of the film, the more likely will a small retardation be obtained. However, when the film thickness is increased, the phase difference in the thickness direction tends to increase. It is therefore preferable to appropriately set the film thickness in the range described later. In addition to the control of retardation, it is necessary to determine the final film production conditions in consideration of physical properties, etc., required for processing.

In order to control the retardation within the above range, it is preferable to control the proportion of the stretch ratio for stretching in the longitudinal direction and the stretch ratio for stretching in the transverse direction of the oriented film. An overly small difference between the longitudinal and transverse stretch ratios is not preferred, because it is difficult to make a difference in retardation. More specifically, the stretch ratio for stretching in the longitudinal direction relative to the stretch ratio for stretching in the transverse direction is preferably 1.0 to 3.5, and particularly preferably 1.0 to 3.0. The stretch ratio for stretching in the transverse direction is preferably 2.5 to 6.0, and particularly preferably 3.0 to 5.5. To increase the retardation, it is also preferable to set the stretch temperature low. The temperature for stretching in the longitudinal direction and the temperature for stretching in the transverse direction are preferably 80 to 130° C., and more preferably 90 to 120° C. In the subsequent heat treatment, the treatment temperature is preferably 100° C. to 250° C., and more preferably 180° C. to 245° C.

The oriented film used in the present invention may have any thickness, but preferably has a thickness in the range of 15 to 200 µm. Even a film having a thickness of lower than 15 µm can, in principle, provide a retardation of 3,000 nm or higher. In this case, however, the mechanical properties of the film become significantly anisotropic. This causes the film to, for example, tear or break, which significantly reduces the practicality of the film as an industrial material. The lower limit of the thickness is particularly preferably 25 µm. On the other hand, the upper limit of the thickness is preferably 200 µm in terms of the practicality as a protective film. When the thickness of the film exceeds 200 µm, the polarizer is overly thick, which is not preferred. The upper limit of the thickness is particularly preferably 100 µm, which is almost equivalent to the thickness of a general TAC film.

In order to suppress variations in retardation, the thickness variation of the film is preferably low. Since the stretch temperature and the stretch ratios have a great influence on the film thickness variation, it is necessary to optimize the film production conditions in terms of the thickness variation. In particular, when the longitudinal stretch ratio is reduced to make a difference in retardation, the longitudinal thickness variation may become significant. Since there is an area in which the longitudinal thickness variation significantly deteriorates in a specific range of the stretch ratio, it is preferable to set the film production conditions outside that range.

The film of the present invention preferably has a thickness variation of 5.0% or less, more preferably 4.5% or less, still more preferably 4.0% or less, and particularly preferably 3.0% or less. The thickness variation of the film can be measured as follows. A tape-like sample (3 m) is taken from the film, and the thickness of the sample is measured in 100 points at a 1-cm pitch by using an electronic micrometer (Miritoron 1240, produced by Seiko EM). The maximum value (dmax), minimum value (dmin), and average value (d) of thickness are determined from the measured values, and the thickness variation (%) is calculated by the following formula. It is preferable to perform the measurement three times and determine the average of the measured values.

Thickness variation (%)=(($d$max−$d$min)/$d$)×100

In order to prevent degradation of the optical functional dye, such as iodine dye, used in the polarizing film, the oriented film preferably has a light transmittance at a wavelength of 380 nm of 20% or less. The light transmittance at 380 nm is more preferably 15% or less, still more preferably 10% or less, and particularly preferably 5% or less. When the above light transmittance is 20% or less, the degradation of the optical functional dye caused by ultraviolet light can be prevented. In addition, the light transmittance in the present invention is measured vertically with respect to the plane of the film, and can be measured with a spectrophotometer (e.g., Hitachi U-3500 spectrophotometer).

In order to adjust the transmittance of the oriented film used in the present invention at a wavelength of 380 nm to 20% or less, it is preferable to suitably control the type and concentration of the ultraviolet absorber, and the thickness of the film. The ultraviolet absorber used in the present invention is a known substance. Examples of the ultraviolet absorber include organic ultraviolet absorbers and inorganic ultraviolet absorbers; however, organic ultraviolet absorbers are preferred in terms of transparency. Specific examples of organic ultraviolet absorbers include benzotriazole-based compounds, benzophenone-based compounds, cyclic imino ester-based compounds, and combinations thereof. Benzotriazole-based compounds and cyclic imino ester-based compounds are particularly preferred in terms of durability. When two or more ultraviolet absorbers are used in combination, ultraviolet lights of different wavelengths can be absorbed at the same time. Thus, the ultraviolet absorption effect can be further improved.

Examples of benzophenone-based ultraviolet absorbers, benzotriazole-based ultraviolet absorbers, and acrylonitrile-based ultraviolet absorbers include 2-[2'-hydroxy-5'-(methacryloyloxymethyl)phenyl]-2H-benzotriazole, 2-[2'-hydroxy-5'-(methacryloyloxyethyl)phenyl]-2H-benzotriazole, 2-[2'-hydroxy-5'-(methacryloyloxypropyl)phenyl]-2H-benzotriazole, 2,2'-dihydroxy-4,4'-dimethoxybenzophenone, 2,2',4,4'-tetrahydroxybenzophenone, 2,4-di-tert-butyl-6-(5-chlorobenzotriazol-2-yl)phenol, 2-(2'-hydroxy-3'-tert-butyl-5'-methylphenyl)-5-chlorobenzotriazole, 2-(5-chloro(2H)-benzotriazol-2-yl)-4-methyl-6-(tert-butyl)phenol, 2,2'-methylenebis(4-(1,1,3,3-tetramethylbutyl)-6-(2H-benzotriazol-2-yl)phenol), etc. Examples of cyclic imino ester-based ultraviolet absorbers include 2,2'-(1,4-phenylene)bis(4H-3,1-benzoxazin-4-one), 2-methyl-3,1-benzoxazin-4-one, 2-butyl-3,1-benzoxazin-4-one, 2-phenyl-3,1-benzoxazin-4-one, etc. However, ultraviolet absorbers are not limited to these examples.

It is also a preferred embodiment that, in addition to the ultraviolet absorber, various additives other than catalysts are added in the range where the effect of the present invention is not impaired. Examples of such additives include inorganic particles, heat-resistant polymer particles, alkali metal compounds, alkaline earth metal compounds, phosphorus compounds, antistatic agents, light-resistant agents, flame retardants, heat stabilizers, antioxidants, anti-gelling agents, surfactants, etc. Moreover, in order to maintain high transparency, it is also preferable that the oriented film does not substantially contain particles. "Not substantially contain particles" indicates that, for example, in the case of inorganic particles, the content of inorganic elements quantified by X-ray fluorescence analysis is 50 ppm or less, preferably 10 ppm or less, and particularly preferably not greater than the detection limit.

A known method can be selected for mixing an ultraviolet absorber with the oriented film. For example, a masterbatch is previously produced by mixing a dried ultraviolet absorber with polymer starting materials using a kneading extruder, and the masterbatch and the polymer starting materials are mixed during the film production.

In that case, the ultraviolet absorber concentration in the masterbatch is preferably 5 to 30 mass % so as to uniformly disperse and economically mix the ultraviolet absorber. Preferred conditions for producing the masterbatch include the use of a kneading extruder, and extrusion at a temperature equal to or greater than the melting point of the polyester starting material and equal to or lower than 290° C. for 1 to 15 minutes. At a temperature of 290° C. or more, a large amount of ultraviolet absorber is lost, and the viscosity of the masterbatch is significantly reduced. For an extrusion time of 1 minute or less, it is difficult to homogeneously mix the ultraviolet absorber. At this point, a stabilizer, a color tone-controlling agent, and an antistatic agent may be added, if necessary.

In the present invention, it is preferable that the oriented film have a multi-layered structure including at least three or more layers, and that an ultraviolet absorber be added to the intermediate layer(s) of the film. Such a three-layer film containing an ultraviolet absorber in the intermediate layer can be specifically produced in the following manner. Polyester pellets are singly used for the outer layers. For the intermediate layer, polyester pellets and a masterbatch containing an ultraviolet absorber are mixed in a predetermined proportion, and then dried. These are supplied into a known extruder for melt-lamination, and extruded through a slit-shaped die into a sheet-like shape, followed by cooling and solidification on a casting roll, thereby forming an unstretched film. More specifically, film layers constituting both outer layers and a film layer constituting the intermediate layer are laminated by using two or more extruders, a three-layer manifold, or a junction block (e.g., a junction block having a square-shaped junction). A three-layered sheet is extruded through a die and cooled on a casting roll, thereby forming an unstretched film. In the present invention, in order to remove foreign substances, which cause optical defects, from the starting material (i.e., polyester), it is preferable to perform high-precision filtration during melt extrusion. The filtration particle size (initial filtration efficiency: 95%) of a filtering medium used for high-precision filtration of the molten resin is preferably 15 µm or less. When the filtration particle size of the filtering medium is more than 15 µm, the removal of foreign substances having a size of 20 µm or more is likely to be insufficient.

The oriented film used in the present invention may be subjected to corona treatment, coating treatment, flame treatment, or the like, so as to enhance adhesion to the polarizing film.

As the polarizing film used in the polarizer of the present invention, any polarizing film generally known in the technical field can be used without limitation. For example, a polarizing film comprising a polyvinyl alcohol-based film and a dichroic material, such as iodine, can be used. The polarizing film used in the present invention can be obtained, for example, in such a manner that a polyvinyl alcohol-based film is dyed with or allowed to adsorb iodine or a dichroic material, and uniaxially stretching the film in a boric acid aqueous solution, followed by washing and drying while the film is kept stretched. The stretch ratio for uniaxial stretching is generally about 4 to 8. A preferable polyvinyl alcohol-based film is polyvinyl alcohol, and commercial products, such as "Kuraray Vinylon" (produced by Kuraray Co., Ltd.), "Tohcello Vinylon" (produced by Mitsui Chemicals Tohcello, Inc.), and "Nichigo Vinylon" (produced by Nippon Synthetic Chemical Industry Co., Ltd.), can be used. Examples of dichroic materials include iodine, disazo compounds, polymethine dyes, and the like. In the case of uniaxial stretching, the polarization axial direction of the polarizing film is the direction of stretching, and can be simply measured by a crossed Nicol test using another polarizer.

In the present invention, the oriented film used as a protective film of a polarizing film is bonded to the polarizing film directly or through an adhesive layer. In terms of improving durability and the adhesion of the oriented film to the polarizing film, it is preferable to bond the oriented film and the polarizing film through an adhesive layer. The components of the adhesive layer may be suitably selected in consideration of a resin component constituting the oriented film and a resin component constituting the polarizing film; however, it is preferable to provide an adhesion-facilitating layer comprising at least one of a polyester resin, a polyurethane resin, and a polyacrylic resin as a main component. The "main component" as used herein refers to, among solid components that constitute the adhesion-facilitating layer, one with 50 mass % or more. The coating solution used to form the adhesion-facilitating layer of the present invention is preferably an aqueous coating solution comprising at least one of a water-soluble or water-dispersible copolymerized polyester resin, acrylic resin, and polyurethane resin. Examples of such coating solutions include a water-soluble or water-dispersible copolymerized polyester resin solution, acrylic resin solution, polyurethane resin solution, etc., as disclosed in JP3567927B, JP3589232B, JP3589233B, JP3900191B, JP4150982B, etc.

When a polyvinyl alcohol resin is used as a main component of the adhesive, usable examples are partially-saponified polyvinyl alcohols and completely-saponified polyvinyl alcohols, as well as modified polyvinyl alcohol resins, such as carboxyl group-modified polyvinyl alcohols, acetoacetyl group-modified polyvinyl alcohols, methylol group-modified polyvinyl alcohols, and amino group-modified polyvinyl alcohols. The concentration of polyvinyl alcohol resin in the adhesive is preferably 1 to 10 mass %, and more preferably 2 to 7 mass %.

The thickness of the adhesive layer is preferably 10 µm or less, more preferably 5 µm or less, and still more preferably 3 µm or less.

The adhesion-facilitating layer can be obtained by, for example, applying the coating solution to one side or both sides of an unstretched film or uniaxially stretched film, followed by drying at 100 to 150° C., and further stretching the film in a transverse direction. The final amount of coating of the adhesion-facilitating layer is preferably maintained in the range of 0.05 to 0.20 g/m$^2$. When the amount of coating is less than 0.05 g/m$^2$, the resulting adhesion to the polarizing film may be insufficient. In contrast, when the amount of coating exceeds 0.20 g/m$^2$, blocking resistance may be reduced. When the adhesion-facilitating layer is provided on both sides of the oriented film, the amounts of coating of the adhesion-facilitating layers on both sides may be the same or different, and can be independently set within the above range.

It is preferable that particles be added to the adhesion-facilitating layer so as to impart slipperiness. Particles having an average particle diameter of 2 µm or less are preferably used. Particles having an average particle diameter of more than 2 µm tend to easily drop out of the coating layer. Examples of the particles to be added to the adhesion-facilitating layer include titanium oxide, barium sulfate, calcium carbonate, calcium sulfate, silica, alumina, talc, kaolin, clay, or mixtures thereof, or combinations with other general inorganic particles, such as calcium phosphate, mica, hectorite, zirconia, tungsten oxide, lithium fluoride, or calcium fluoride; and styrene, acrylic, melamine, benzoguanamine, silicone, and other organic polymer particles.

The method for applying the coating solution may be a known method. Examples thereof include reverse-roll coating, gravure coating, kiss coating, roll-brush coating, spray coating, air-knife coating, wire-bar coating, pipe doctor method, and the like. These methods can be used singly or in combination.

The average particle diameter of the above particles can be measured in the following manner. Images of the particles are taken by a scanning electron microscope (SEM). The maximum diameter of 300 to 500 individual particles (distance between the most separated two points) is measured at such a magnification that the size of the smallest single particle is 2 to 5 mm. The average of the maximum diameter of the particles is regarded as the average particle diameter.

The polarizer of the present invention can be coated with various hard coatings so as to prevent background reflections, glare, scratches, and so on.

The liquid crystal display device of the present invention comprises, as components, at least a backlight light source, two polarizers, and a liquid crystal cell disposed between the two polarizers; and optionally comprises various optical functional films, such as a hard-coat film, an anti-glare film, an antireflection film, a color filter, a lens sheet, a diffusion sheet, a diffuser, and a light guide plate. The liquid crystal display device of the present invention uses the polarizer of the present invention as at least one of its polarizers. In order to control the polarization state of light emitted from the liquid crystal display device as described above, it is preferable to use the polarizer of the present invention as the polarizer disposed on the viewing side of the liquid crystal cell. The oriented protective films provided on both sides of the polarizing film of the polarizer can be bonded to the polarizing film so that the orientation axes or orthogonal axes of both protective films and the polarization axis of the polarizing film make an angle of 1° or more and less than 45°. In terms of increasing the amount of light entering the polarizing film disposed on the viewing side, it is preferable that only the protective film on the viewing side of the polarizing film be bonded to the polarizing film so that the angle between the orientation axis or orthogonal axis of the protective film and the polarization axis of the polarizing film is 1° or more and less than 45°. In other words, the oriented film that is a protective film located on the backlight side of the polarizing film disposed on the viewing side of the liquid crystal cell is preferably bonded to the polarizing film so that the orientation axis or orthogonal axis of the oriented film is parallel to the polarization axis of the polarizing film. When a polarizer comprising a polarizing film and an oriented film is used as the polarizer disposed on the backlight light source side, the tilt of the orientation axis or orthogonal axis of the oriented film relative to the polarization axis of the polarizing film is preferably 10° or less, more preferably 7° or less, even more preferably 5° or less, and most preferably 0°, in terms of increasing the amount of light entering the liquid crystal cell.

The liquid crystal display device of the present invention is preferably capable of displaying three-dimensional images that are visible through a polarizing filter. The liquid crystal display device of the present invention preferably comprises a liquid crystal cell and a control device thereof compatible with three-dimensional display. The method of providing three-dimensional images is not limited. For example, a polarizing filter system and an active shutter system can be used. Both systems are ways to view three-dimensional images through special glasses with polarizing filters. The former system employs special glasses (passive type) with polarizing filters having orientation axes orthogonal to each other on the left and right sides, or circular-polarizing filters with different directions of polarization on the left and right sides. The latter system employs special glasses (active type) with polarizing filters that are opened and closed in synchronization with the switching of the images. The active type is more preferable for liquid crystal display devices capable of displaying three-dimensional images using the polarizer of the present invention. When the passive type is employed, the liquid crystal display device simultaneously shows images for the left and right eyes with two polarized light beams orthogonal to each other; thus, it may be difficult to obtain sharp stereoscopic images due to clear polarization selection when the polarizer of the present invention is used.

EXAMPLES

The present invention will hereinafter be described more specifically by way of Examples; however, the present invention is not limited to the Examples described below. The present invention can be put into practice after appropriate modifications or variations within a range meeting the gist of the present invention, all of which are included in the technical scope of the present invention. In the Examples, the methods for the evaluation of physical properties are as follows:

(1) Retardation (Re)

Retardation (Re) is a parameter defined by the product ($\Delta Nxy \times d$) of the anisotropy ($\Delta Nxy = |Nx - Ny|$) of refractive indices in two mutually orthogonal directions on a film and the film thickness d (nm), and is a scale indicating optical isotropy or anisotropy. The anisotropy ($\Delta Nxy$) of refractive indices in two directions was obtained by the following method. The directions of orientation axes of an oriented film were determined using two polarizers, and the film was cut into a 4 cm×2 cm rectangle so that the direction of the orientation axis was orthogonal to either side of the rectangle. The cut piece was used as a sample for measurement. The sample was measured for the refractive indices (Nx and Ny) in two mutually orthogonal directions and the refractive index (Nz) in the thickness direction by the use of an Abbe refractometer (NAR-4T available from Atago Co., Ltd.). Then, the absolute value ($|Nx - Ny|$) of the difference between the refractive indices in two directions was defined as the anisotropy ($\Delta Nxy$) of the refractive indices. The film thickness d (nm) was measured using an electric micrometer (Millitron 1245D, available from Feinpruf GmbH), and was converted to nm units. The retardation (Re) was determined by the product ($\Delta Nxy \times d$) of the anisotropy ($\Delta Nxy$) of the refractive indices and the film thickness d (nm).

(2) Thickness-Direction Retardation (Rth)

Thickness-direction retardation (Rth) is a parameter indicating the average of retardation obtained by multiplying two birefringence values $\Delta Nxz$ ($=|Nx-Nz|$) and $\Delta Nyz$ ($=|Ny-Nz|$) when viewed from a film-thickness direction cross-section, by a film thickness d. The refractive indices Nx, Ny, and Nz, and the film thickness d (nm) were determined in the same manner as in the measurement of retardation (Re), and the average value of ($\Delta Nxz \times d$) and ($\Delta Nyz \times d$) was calculated to determine the thickness-direction retardation (Rth).

(3) Light Transmittance at Wavelength of 380 nm

Using a spectrophotometer (U-3500, produced by Hitachi, Ltd.), the light transmittance of each film at a wavelength of 300 to 500 nm was measured using the air space as standard, and the light transmittance at a wavelength of 380 nm was determined.

(4) Evaluation of Rainbow Unevenness

An oriented film produced by the method described below was bonded to one side of a polarizing film comprising PVA and iodine, and a TAC film (produced by Fujifilm Corporation; thickness: 80 μm) was bonded to the other side of the polarizing film, thereby producing a polarizer. The oriented film was bonded to the polarizing film so that the angle between the orientation axis of the oriented film and the polarization axis of the polarizing film was about 5°. The obtained polarizer was placed on the light-outgoing side of a liquid crystal display device (having a polarizer comprising two TAC films as protective films on the light-incoming side of the liquid crystal cell) that employed, as a light source, white LEDs (NSPW500CS, available from Nichia Corporation; cold-cathode tubes for Film I) having light-emitting devices obtained by the combined use of yttrium-aluminum-garnet yellow phosphors with blue light-emitting diodes, so that the oriented film was disposed on the light-outgoing side. That is, the TAC film was disposed on the light source side. The polarizer of the liquid crystal display device was visually observed through a polarizing filter from the front direction and oblique directions (0° to 90°), and the occurrence of rainbow unevenness was determined as follows.

++: no formation of rainbow unevenness observed from any direction

+: partial, very light rainbow unevenness observed from an oblique direction

−: clear rainbow unevenness observed from an oblique direction

Tear Strength

The tear strength of each film was measured according to JIS P-8116 using an Elmendorf tearing tester (produced by Toyo Seiki Seisaku-sho, Ltd.). The tear direction was parallel to the orientation axis direction of the film. The orientation axis direction was measured by a molecular orientation analyzer (MOA-6004, produced by Oji Scientific Instruments).

(5) Measurement of Screen Brightness

Oriented films produced by the method described below were each bonded to one side of a polarizing film comprising PVA and iodine, and a TAC film (produced by Fujifilm Corporation; thickness: 80 µm) was bonded to the opposite side of the polarizing film, thereby producing a polarizer. The oriented film was bonded to the polarizing film so that the angle between the orientation axis of the oriented film and the polarization axis of the polarizing film was 0°, 1°, 3°, 5°, 7°, 10°, 15°, 20°, 30°, or 45°; or so that the angle between the orthogonal axis of the oriented film and the polarization axis of the polarizing film was 0°, 1°, 3°, 5°, 7°, 10°, 15°, 20°, 30°, or 45°. The orientation axis of the oriented film was measured by a molecular orientation analyzer (MOA-6004, produced by Oji Scientific Instruments).

Each of the obtained polarizers was placed on the light-outgoing side of a liquid crystal display device (having a polarizer comprising two TAC films as protective films on the light-incoming side of the liquid crystal cell) that employed, as a light source, white LEDs (NSPW500CS, available from Nichia Corporation) having light-emitting devices obtained by the combined use of yttrium-aluminum-garnet yellow phosphors with blue light-emitting diodes, so that the oriented film was disposed on the viewing side.

A commercially available polarizing filter (Linear Polarizer SHLP44, produced by MeCan Imaging Inc.) was placed on the liquid crystal display device. The brightness of light passing through the polarizing filter was measured when the polarization axis direction of the polarizing filter was parallel (front state) or perpendicular (lying state) to the polarization axis of the polarizing film on the viewing side. The brightness was measured by RISA-COLOR/ONE-II (produced by Hi-Land). The liquid crystal display device produced as described above was horizontally placed, and a white image (size: 131×131 mm; Farbe mode of Nokia Monitor Test for Windows V 1.0 (published by Nokia)) was displayed in the center of the panel. A CCD camera was placed at a vertical distance of 1 m from the display, and the measurement was performed. The white image was divided into 25 (5×5) pixels, and 9 (3×3) pixels in the center area of the image were measured for brightness. The average of the measured values was used to represent the brightness.

The measured brightness was evaluated as follows.

Brightness in Front State

As for the brightness in the front state (brightness in the parallel state), the retention rate of brightness at each tilt angle in comparison with brightness when the tilt angle of the orientation axis of the oriented film relative to the polarization axis of the polarizing film was 0° (i.e., parallel) was determined by the following formula, and the results were evaluated by the 4-grade scale shown below.

Retention rate=(brightness at each tilt angle)/(brightness at 0°)×100

+++: 90% or more

++: 80% or more and less than 90%+

+: 58% or more and less than 80%

−: less than 58%.

Brightness in Lying State

As for the brightness in the lying state (brightness in the orthogonal state), the increase rate of brightness at each tilt angle in comparison with brightness when the tilt angle of the orientation axis of the oriented film relative to the polarization axis of the polarizing film was 0° (e.g., parallel) was determined by the following formula, and the results were evaluated by the 4-grade scale shown below.

Increase rate=(brightness at each tilt angle in the lying state−brightness at 0° in the lying state)/(brightness at 0° in the front state)×100

+++: 3% or more

++: 1% or more and less than 3%+

+: 0.1% or more and less than 1%

−: 0%.

Comprehensive Evaluation

The evaluation of the brightness in the front state at each tilt angle and the evaluation of the brightness in the lying state at each tilt angle were compared, and the lower evaluation was employed as the comprehensive evaluation of the tilt angle.

Production Example 1: Polyester A

The temperature of an esterification reaction vessel was raised, and when the temperature reached 200° C., 86.4 parts by mass of terephthalic acid and 64.6 parts by mass of ethylene glycol were put in the vessel. While stirring the mixture, 0.017 parts by mass of antimony trioxide, 0.064 parts by mass of magnesium acetate tetrahydrate, and 0.16 parts by mass of triethylamine were added as catalysts. Subsequently, the pressure and temperature were raised, and pressure esterification was performed at a gauge pressure of 0.34 MPa at 240° C. Then, the pressure in the esterification reaction vessel was returned to normal pressure, and 0.014 parts by mass of phosphoric acid was added. Further, the temperature was raised to 260° C. over 15 minutes, and 0.012 parts by mass of trimethyl phosphate was added. Subsequently, after 15 minutes, dispersion was performed with a high-pressure disperser. After 15 minutes, the obtained esterification reaction product was transferred to a polycondensation reaction vessel, and a polycondensation reaction was performed at 280° C. under reduced pressure.

After completion of the polycondensation reaction, filtration was performed using a Naslon filter (95% cut size: 5 μm). The resultant was extruded through a nozzle into a strand shape, cooled and solidified with cooling water, which had been previously filtered (pore size: 1 μm or less), and cut into pellets. The obtained polyethylene terephthalate resin (A) had an intrinsic viscosity of 0.62 dl/g, and did not substantially contain inert particles and internally deposited particles (hereafter abbreviated as "PET (A)").

Production Example 2: Polyester B

A dried ultraviolet absorber (2,2'-(1,4-phenylene)bis(4H-3,1-benzoxazinon-4-one) (10 parts by mass) and 90 parts by mass of particle-free PET (A) (intrinsic viscosity: 0.62 dl/g) were mixed, and a kneading extruder was used to obtain a polyethylene terephthalate resin (B) containing the ultraviolet absorber (hereafter abbreviated as "PET (B)").

Production Example 3: Preparation of Adhesion-Modified Coating Solution

A transesterification reaction and a polycondensation reaction were performed in a standard manner to prepare a water-dispersible sulfonic acid metal salt group-containing copolymerized polyester resin comprising, as dicarboxylic acid components (based on the entire dicarboxylic acid components), 46 mol % of terephthalic acid, 46 mol % of isophthalic acid, and 8 mol % of sodium 5-sulfonatoisophthalate; and as glycol components (based on the entire glycol components), 50 mol % of ethylene glycol and 50 mol % of neopentyl glycol. Subsequently, 51.4 parts by mass of water, 38 parts by mass of isopropyl alcohol, 5 parts by mass of n-butyl cellosolve, and 0.06 parts by mass of nonionic surfactant were mixed, and then stirred under heating. When the temperature reached 77° C., 5 parts by mass of the above water-dispersible sulfonic acid metal salt group-containing copolymerized polyester resin was added, and continuously stirred until the mass of the resin disappeared. Thereafter, the resulting resin aqueous dispersion was cooled to room temperature, thereby obtaining a homogeneous water-dispersible copolymerized polyester resin solution having a solids content of 5.0 mass %. Furthermore, 3 parts by mass of aggregate silica particles (Sylysia 310, produced by Fuji Silysia Chemical Ltd.) was dispersed in 50 parts by mass of water. Then, 0.54 parts by mass of the water dispersion of Sylysia 310 was added to 99.46 parts by mass of the above water-dispersible copolymerized polyester resin solution. While stirring the mixture, 20 parts by mass of water was added, thereby obtaining an adhesion-modified coating solution.

Film A

As the starting materials for the base film intermediate layer, 90 parts by mass of particle-free PET (A) resin pellets and 10 parts by mass of ultraviolet absorber-containing PET (B) resin pellets were vacuum-dried (1 Torr) at 135° C. for 6 hours, and then supplied to an extruder 2 (for the intermediate layer II). Further, PET (A) was dried by a standard method, supplied to extruders 1 (each for the outer layer I and the outer layer III), and melted at 285° C. These two polymers were each filtered through a filtering medium of a stainless steel sintered body (nominal filtering accuracy: 10 μm-particle 95% cut), laminated by two types of three-layered junction blocks, and extruded through a die into a sheet-like shape. The resulting sheet was cooled and solidified by winding the sheet around a casting drum having a surface temperature of 30° C. by an electrostatic casting method, thereby forming an unstretched film. At this time, the discharge of each extruder was adjusted so that the thickness ratio of layer I, layer II, and layer III was 10:80:10.

Then, the above-prepared adhesion-modifying coating solution was applied to both sides of the unstretched PET film by reverse-roll coating so that the amount of dried coating was 0.08 g/m², followed by drying at 80° C. for 20 seconds.

The unstretched film, on which a coating layer had been formed, was guided to a tenter stretching machine. While holding the edges of the film with clips, the film was guided to a hot-air zone with a temperature of 125° C., and stretched 4.0 times in the width direction. Subsequently, while maintaining the width of the film stretched in the width direction, the film was treated at a temperature of 225° C. for 30 seconds, and further subjected to 3% relaxation treatment in the width direction. Thus, a uniaxially oriented PET film A having a thickness of about 50 μm was obtained.

Film B

A uniaxially oriented PET film B was obtained in the same manner as the production of the film A, except that the thickness of the unstretched film was changed so that the thickness of the film was about 100 μm.

Film C

A biaxially oriented PET film C having a thickness of about 50 μm was obtained in the same manner as the production of the film A, except that the unstretched film was heated to 105° C. using heated rolls and an infrared heater, and that the film was then stretched 1.5 times in the running direction by rolls having different peripheral speeds, and then stretched 4.0 times in the width direction.

Film D

A biaxially oriented PET film D having a thickness of about 50 μm was obtained in the same manner as the production of the film C, except that the unstretched film was stretched 2.0 times in the running direction and 4.0 times in the width direction.

Film E

A biaxially oriented PET film E having a thickness of about 75 μm was obtained in the same manner as the production of the film C, except that the unstretched film was stretched 3.3 times in the running direction and 4.0 times in the width direction.

Film F

A uniaxially oriented PET film having a thickness of about 50 μm was obtained in the same manner as the production of the film A, except that the ultraviolet absorber-containing PET resin (B) was not used in the intermediate layer.

Film G

A biaxially oriented PET film G having a thickness of about 38 μm was obtained in the same manner as the production of the film C, except that the unstretched film was stretched 3.6 times in the running direction and 4.0 times in the width direction.

Film H

A uniaxially oriented PET film H having a thickness of about 10 μm was obtained in the same manner as the production of the film A, except that the thickness of the unstretched film was changed.

Film I

The film itself was the same as the film A; however, rainbow unevenness was evaluated using cold-cathode tubes, rather than white light-emitting diodes, as the light source.

Film J

A polycarbonate resin produced from phosgene and bisphenol A was supplied to each extruder by a standard method, and melted at 290° C. The resultant was filtered through a filtering medium of a stainless steel sintered body (nominal filtering accuracy: 10 μm-particle 95% cut), and extruded through a die into a sheet-like shape. The resulting sheet was than cooled and solidified by winding the sheet around a casting drum having a surface temperature of 30° C. by an electrostatic casting method, thereby forming an unstretched film. Subsequently, a coating layer was formed in the same manner as the production of the film A, and the unstretched film was then guided to a tenter stretching machine. While holding the edges of the film with clips, the film was guided to a hot-air zone with a temperature of 155° C., and stretched 4.0 times in the width direction. Subsequently, heat fixation and relaxation treatments were performed in the same manner as the production of the film A. Thus, a uniaxially oriented polycarbonate film having a thickness of about 70 μm was obtained.

Film K

A biaxially oriented PET film K having a thickness of about 188 μm was obtained in the same manner as the production of the film C, except that the unstretched film was stretched 3.6 times in the running direction and 4.0 times in the width direction.

Film L

A uniaxially oriented PET film L having a thickness of about 100 μm was obtained in the same manner as the production of the film C, except that the unstretched film was stretched 4.0 times in the running direction and 1.0 times in the width direction.

Film M

A uniaxially oriented PET film M was obtained in the same manner as the production of the film L, except that the unstretched film was stretched 3.6 times in the running direction.

Table 1 shows the characteristics of the obtained films and the results of the observation of rainbow unevenness.

TABLE 1

| | Thickness (μm) | Running-direction stretch ratio | Width-direction stretch ratio | Nx | Ny | Nz | Re (nm) | Rth (nm) | Re/Rth ratio | Observation of rainbow unevenness | Tear strength (mN) | 380-nm light transmittance (%) |
|---|---|---|---|---|---|---|---|---|---|---|---|---|
| Film A | 50 | 1.0 | 4.0 | 1.593 | 1.697 | 1.513 | 5177 | 6602 | 0.784 | ++ | 200 | 8.5 |
| Film B | 100 | 1.0 | 4.0 | 1.594 | 1.696 | 1.513 | 10200 | 13233 | 0.771 | ++ | 395 | 1.0 |
| Film C | 50 | 1.5 | 4.0 | 1.608 | 1.686 | 1.508 | 3915 | 6965 | 0.562 | + | 650 | 8.5 |
| Film D | 50 | 2.0 | 4.0 | 1.617 | 1.681 | 1.502 | 3215 | 7341 | 0.438 | + | 955 | 8.5 |
| Film E | 75 | 3.3 | 4.0 | 1.640 | 1.688 | 1.498 | 3570 | 12480 | 0.286 | + | ≥1000 | 2.5 |
| Film F | 50 | 1.0 | 4.0 | 1.593 | 1.697 | 1.513 | 5177 | 6602 | 0.784 | ++ | 200 | 79.0 |
| Film G | 38 | 3.6 | 4.0 | 1.649 | 1.680 | 1.497 | 1178 | 6365 | 0.185 | − | ≥1000 | 15.0 |
| Film H | 10 | 1.0 | 4.0 | 1.591 | 1.698 | 1.513 | 1070 | 1318 | 0.812 | − | 40 | 56.0 |
| Film I | 50 | 1.0 | 4.0 | 1.593 | 1.697 | 1.513 | 5177 | 6602 | 0.784 | − | 200 | 8.5 |
| Film J | 70 | 1.0 | 4.0 | 1.604 | 1.685 | 1.532 | 5670 | 7875 | 0.720 | ++ | 255 | 88.0 |
| Film K | 188 | 3.6 | 4.0 | 1.651 | 1.680 | 1.495 | 5452 | 32054 | 0.170 | − | ≥1000 | 0.3 |
| Film L | 100 | 4.0 | 1.0 | 1.735 | 1.570 | 1.520 | 16500 | 13250 | 1.245 | ++ | 25 | 1.0 |
| Film M | 100 | 3.6 | 1.0 | 1.707 | 1.573 | 1.525 | 13400 | 11500 | 1.165 | ++ | 100 | 1.0 |

The results of Table 1 show that no rainbow unevenness was observed at all in the films A, B, F, J, L, and M; very slight rainbow unevenness was partially observed in the films C to E; and clear rainbow unevenness was observed in the films G to I and K. A comparison of the results of the films A and I revealed that the occurrence of rainbow unevenness was suppressed by using a polarizer comprising an oriented film having a specific retardation as a protective film, and using white light-emitting diodes as the light source. Moreover, the fact that rainbow unevenness was observed in the film K indicates that even through Re was 3,000 nm or more, the occurrence of rainbow unevenness could not be suppressed when the Re/Rth ratio was less than 0.2. Furthermore, the fact that the film L had an insufficient tear strength of 25 mN indicates that tear strength remarkably decreased at an Re/Rth ratio greater than 1.2.

Tables 2 and 3 show the results of the measurement of screen brightness regarding polarizers produced by using each of the films A to H and J to M. The results of Table 2 demonstrated that when the tilt of the orientation axis of the oriented film relative to the polarization axis of the polarizing film was 45°, the brightness was at the same level both in the front and lying states; however, the brightness was about half the brightness in the front state at 0°, and was not suitable particularly for liquid crystal display devices capable of displaying three-dimensional images, for which high brightness is required. Moreover, the results of Table 3 confirmed that the same results were obtained in relationship with the tilt of the orthogonal axis of the oriented film relative to the polarization axis of the polarizing film.

TABLE 2

| | Orientation main axis tilt (°) | Angle between orientation axis and polarization axis | | | | | | | | | |
|---|---|---|---|---|---|---|---|---|---|---|---|
| | | 0 | 1 | 3 | 5 | 7 | 10 | 15 | 20 | 30 | 45 |
| Film A | Front state | 200.3 | 199.0 | 195.1 | 190.4 | 183.3 | 168.2 | 159.6 | 154.7 | 127.7 | 110.5 |
| | % | 100.0 | 99.4 | 97.4 | 95.1 | 91.5 | 84.0 | 79.7 | 77.2 | 63.8 | 55.2 |
| | Evaluation | +++ | +++ | +++ | +++ | +++ | ++ | + | + | + | − |
| | Lying state | 5.8 | 6.2 | 8.4 | 12.3 | 24.7 | 41.9 | 49.0 | 50.2 | 81.5 | 103.0 |
| | % | 0.0 | 0.2 | 1.3 | 3.3 | 9.4 | 18.0 | 21.6 | 22.2 | 37.8 | 48.5 |
| | Evaluation | − | + | ++ | +++ | +++ | +++ | +++ | +++ | +++ | +++ |
| | Comprehensive evaluation | − | + | ++ | +++ | +++ | ++ | + | + | + | − |
| Film B | Front state | 198.3 | 196.9 | 193.4 | 189.1 | 180.3 | 165.5 | 156.5 | 152.6 | 125.8 | 105.5 |
| | % | 100.0 | 99.3 | 97.5 | 95.4 | 90.9 | 83.5 | 78.9 | 77.0 | 63.5 | 53.2 |
| | Evaluation | +++ | +++ | +++ | +++ | +++ | ++ | + | + | + | − |
| | Lying state | 6.0 | 6.4 | 8.6 | 12.5 | 25.0 | 42.1 | 49.3 | 50.4 | 81.7 | 103.5 |
| | % | 0.0 | 0.2 | 1.3 | 3.3 | 9.6 | 18.2 | 21.9 | 22.4 | 38.2 | 49.2 |
| | Evaluation | − | + | ++ | +++ | +++ | +++ | +++ | +++ | +++ | +++ |
| | Comprehensive evaluation | − | + | ++ | +++ | +++ | ++ | + | + | + | − |
| Film C | Front state | 199.9 | 198.8 | 194.5 | 189.9 | 183.0 | 167.7 | 159.1 | 153.9 | 126.6 | 110.1 |
| | % | 100.0 | 99.4 | 97.3 | 95.0 | 91.5 | 83.9 | 79.6 | 77.0 | 63.3 | 55.1 |
| | Evaluation | +++ | +++ | +++ | +++ | +++ | ++ | + | + | + | − |
| | Lying state | 5.9 | 6.3 | 8.5 | 12.4 | 24.7 | 41.9 | 49.1 | 50.3 | 81.6 | 103.1 |
| | % | 0.0 | 0.2 | 1.3 | 3.2 | 9.4 | 18.0 | 21.6 | 22.2 | 37.9 | 48.6 |
| | Evaluation | − | + | ++ | +++ | +++ | +++ | +++ | +++ | +++ | +++ |
| | Comprehensive evaluation | − | + | ++ | +++ | +++ | ++ | + | + | + | − |
| Film D | Front state | 201.8 | 199.3 | 198.7 | 197.2 | 194.0 | 187.3 | 174.2 | 153.5 | 118.4 | 90.0 |
| | % | 100.0 | 98.8 | 98.5 | 97.7 | 96.1 | 92.8 | 86.3 | 76.1 | 58.7 | 44.6 |
| | Evaluation | +++ | +++ | +++ | +++ | +++ | +++ | ++ | + | + | − |
| | Lying state | 5.3 | 5.5 | 6.0 | 7.3 | 11.5 | 16.6 | 33.1 | 52.6 | 89.7 | 119.4 |
| | % | 0.0 | 0.1 | 0.3 | 1.0 | 3.1 | 5.6 | 13.8 | 23.5 | 41.8 | 56.5 |
| | Evaluation | − | + | + | ++ | +++ | +++ | +++ | +++ | +++ | +++ |
| | Comprehensive evaluation | − | + | + | ++ | +++ | +++ | ++ | + | + | − |
| Film E | Front state | 201.9 | 200.0 | 199.1 | 197.9 | 194.5 | 187.6 | 174.6 | 153.9 | 119.0 | 90.2 |
| | % | 100.0 | 99.1 | 98.6 | 98.0 | 96.3 | 92.9 | 86.5 | 76.2 | 58.9 | 44.7 |
| | Evaluation | +++ | +++ | +++ | +++ | +++ | +++ | ++ | + | + | − |
| | Lying state | 5.3 | 5.5 | 5.9 | 7.3 | 11.4 | 16.6 | 33.0 | 52.6 | 89.6 | 119.4 |
| | % | 0.0 | 0.1 | 0.3 | 1.0 | 3.0 | 5.6 | 13.7 | 23.4 | 41.8 | 56.5 |
| | Evaluation | − | + | + | ++ | +++ | +++ | +++ | +++ | +++ | +++ |
| | Comprehensive evaluation | − | + | + | ++ | +++ | +++ | ++ | + | + | − |
| Film F | Front state | 198.3 | 196.8 | 193.4 | 189.2 | 180.3 | 165.6 | 156.4 | 152.6 | 125.8 | 105.4 |
| | % | 100.0 | 99.2 | 97.5 | 95.4 | 90.9 | 83.5 | 78.9 | 77.0 | 63.4 | 53.2 |
| | Evaluation | +++ | +++ | +++ | +++ | +++ | ++ | + | + | + | − |
| | Lying state | 5.8 | 6.3 | 8.5 | 12.4 | 24.8 | 42.0 | 49.0 | 50.3 | 81.5 | 103.1 |
| | % | 0.0 | 0.2 | 1.4 | 3.3 | 9.6 | 18.3 | 21.8 | 22.4 | 38.2 | 49.1 |
| | Evaluation | − | + | ++ | +++ | +++ | +++ | +++ | +++ | +++ | +++ |
| | Comprehensive evaluation | − | + | ++ | +++ | +++ | ++ | + | + | + | − |
| Film G | Front state | 201.1 | 199.8 | 197.8 | 197.5 | 193.1 | 190.8 | 181.0 | 167.5 | 146.2 | 126.9 |
| | % | 100.0 | 99.4 | 98.4 | 98.2 | 96.0 | 94.9 | 90.0 | 83.3 | 72.7 | 63.1 |
| | Evaluation | +++ | +++ | +++ | +++ | +++ | +++ | +++ | ++ | + | + |
| | Lying state | 5.9 | 6.3 | 6.7 | 7.9 | 12.6 | 16.8 | 27.7 | 43.1 | 65.0 | 84.6 |
| | % | 0.0 | 0.2 | 0.4 | 1.0 | 3.3 | 5.4 | 10.8 | 18.5 | 29.4 | 39.1 |
| | Evaluation | − | + | + | ++ | +++ | +++ | +++ | +++ | +++ | +++ |
| | Comprehensive evaluation | − | + | + | ++ | +++ | +++ | +++ | ++ | + | + |
| Film H | Front state | 200.0 | 198.2 | 195.3 | 191.1 | 188.9 | 175.1 | 167.2 | 159.5 | 136.2 | 114.3 |
| | % | 100.0 | 99.1 | 97.7 | 95.6 | 94.5 | 87.6 | 83.6 | 79.8 | 68.1 | 57.2 |
| | Evaluation | +++ | +++ | +++ | +++ | +++ | ++ | ++ | + | + | − |
| | Lying state | 6.0 | 6.4 | 7.0 | 8.4 | 13.0 | 18.4 | 29.1 | 43.9 | 66.0 | 85.9 |
| | % | 0.0 | 0.2 | 0.5 | 1.2 | 3.5 | 6.2 | 11.5 | 18.9 | 30.0 | 39.9 |
| | Evaluation | − | + | + | ++ | +++ | +++ | +++ | +++ | +++ | +++ |
| | Comprehensive evaluation | − | + | + | ++ | +++ | ++ | ++ | + | + | − |
| Film J | Front state | 198.5 | 196.8 | 193.2 | 189.0 | 180.3 | 165.4 | 156.3 | 152.4 | 125.6 | 105.5 |
| | % | 100.0 | 99.1 | 97.3 | 95.2 | 90.8 | 83.3 | 78.7 | 76.8 | 63.3 | 53.1 |
| | Evaluation | +++ | +++ | +++ | +++ | +++ | ++ | + | + | + | − |
| | Lying state | 6.0 | 6.4 | 8.5 | 12.5 | 25.1 | 42.2 | 49.4 | 50.6 | 81.8 | 103.8 |
| | % | 0.0 | 0.2 | 1.3 | 3.3 | 9.6 | 18.2 | 21.9 | 22.5 | 38.2 | 49.3 |
| | Evaluation | − | + | ++ | +++ | +++ | +++ | +++ | +++ | +++ | +++ |
| | Comprehensive evaluation | − | + | ++ | +++ | +++ | ++ | + | + | + | − |
| Film K | Front state | 200.9 | 199.7 | 197.7 | 197.2 | 193.0 | 190.7 | 181.0 | 167.8 | 146.4 | 126.0 |
| | % | 100.0 | 99.4 | 98.4 | 98.2 | 96.1 | 94.9 | 90.1 | 83.5 | 72.9 | 62.7 |
| | Evaluation | +++ | +++ | +++ | +++ | +++ | +++ | +++ | ++ | + | + |
| | Lying state | 5.9 | 6.3 | 6.7 | 7.9 | 12.6 | 16.8 | 27.7 | 43.1 | 65.0 | 84.6 |

TABLE 2-continued

| Orientation main axis tilt (°) | | Angle between orientation axis and polarization axis | | | | | | | | | |
|---|---|---|---|---|---|---|---|---|---|---|---|
| | | 0 | 1 | 3 | 5 | 7 | 10 | 15 | 20 | 30 | 45 |
| | % | 0.0 | 0.2 | 0.4 | 1.0 | 3.3 | 5.4 | 10.8 | 18.5 | 29.4 | 39.1 |
| | Evaluation | − | + | + | ++ | +++ | +++ | +++ | +++ | +++ | +++ |
| | Comprehensive evaluation | − | + | + | ++ | +++ | +++ | +++ | ++ | + | + |
| Film L | Front state | 200.6 | 199.2 | 195.5 | 190.7 | 183.6 | 168.3 | 161.0 | 155.6 | 128.3 | 111.1 |
| | % | 100.0 | 99.3 | 97.5 | 95.1 | 91.5 | 83.9 | 80.3 | 77.6 | 64.0 | 55.4 |
| | Evaluation | +++ | +++ | +++ | +++ | +++ | ++ | ++ | + | + | − |
| | Lying state | 5.8 | 6.2 | 8.4 | 12.3 | 24.7 | 41.9 | 49.0 | 50.2 | 81.5 | 103.0 |
| | % | 0.0 | 0.2 | 1.3 | 3.3 | 9.4 | 18.0 | 21.6 | 22.2 | 37.8 | 48.5 |
| | Evaluation | − | + | ++ | +++ | +++ | +++ | +++ | +++ | +++ | +++ |
| | Comprehensive evaluation | − | + | ++ | +++ | +++ | ++ | ++ | + | + | − |
| Film M | Front state | 198.3 | 196.9 | 193.4 | 189.1 | 180.3 | 165.5 | 156.5 | 152.6 | 125.8 | 105.5 |
| | % | 100.0 | 99.3 | 97.5 | 95.4 | 90.9 | 83.5 | 78.9 | 77.0 | 63.5 | 53.2 |
| | Evaluation | +++ | +++ | +++ | +++ | +++ | ++ | + | + | + | − |
| | Lying state | 6.0 | 6.4 | 8.6 | 12.5 | 25.0 | 42.1 | 49.3 | 50.4 | 81.7 | 103.5 |
| | % | 0.0 | 0.2 | 1.3 | 3.3 | 9.6 | 18.2 | 21.9 | 22.4 | 38.2 | 49.2 |
| | Evaluation | − | + | ++ | +++ | +++ | +++ | +++ | +++ | +++ | +++ |
| | Comprehensive evaluation | − | + | ++ | +++ | +++ | ++ | + | + | + | − |

TABLE 3

| Orthogonal axis tilt (°) | | Angle between orthogonal axis and polarization axis | | | | | | | | | |
|---|---|---|---|---|---|---|---|---|---|---|---|
| | | 0 | 1 | 3 | 5 | 7 | 10 | 15 | 20 | 30 | 45 |
| Film A | Front state | 200.1 | 198.8 | 194.7 | 189.8 | 183.1 | 167.9 | 159.1 | 154.5 | 127.4 | 110.5 |
| | % | 99.9 | 99.3 | 97.2 | 94.8 | 91.4 | 83.8 | 79.4 | 77.2 | 63.6 | 55.2 |
| | Evaluation | +++ | +++ | +++ | +++ | +++ | ++ | + | + | + | − |
| | Lying state | 5.9 | 6.4 | 8.7 | 12.5 | 25.2 | 42.3 | 50.0 | 50.7 | 82.3 | 105.1 |
| | % | 0.0 | 0.3 | 1.4 | 3.3 | 9.7 | 18.2 | 22.1 | 22.4 | 38.2 | 49.6 |
| | Evaluation | − | + | ++ | +++ | +++ | +++ | +++ | +++ | +++ | +++ |
| | Comprehensive evaluation | − | + | ++ | +++ | +++ | ++ | + | + | + | − |
| Film B | Front state | 198.1 | 196.7 | 193.0 | 188.6 | 180.1 | 165.2 | 156.0 | 152.5 | 125.6 | 105.5 |
| | % | 99.9 | 99.2 | 97.3 | 95.1 | 90.8 | 83.3 | 78.7 | 76.9 | 63.3 | 53.2 |
| | Evaluation | +++ | +++ | +++ | +++ | +++ | ++ | + | + | + | − |
| | Lying state | 6.1 | 6.6 | 8.8 | 12.6 | 25.5 | 42.5 | 50.3 | 50.9 | 82.5 | 105.6 |
| | % | 0.0 | 0.3 | 1.4 | 3.3 | 9.8 | 18.4 | 22.4 | 22.7 | 38.6 | 50.2 |
| | Evaluation | − | + | ++ | +++ | +++ | +++ | +++ | +++ | +++ | +++ |
| | Comprehensive evaluation | − | + | ++ | +++ | +++ | ++ | + | + | + | − |
| Film C | Front state | 199.7 | 198.6 | 194.1 | 189.3 | 182.8 | 167.4 | 158.6 | 153.7 | 126.3 | 110.1 |
| | % | 99.9 | 99.4 | 97.1 | 94.7 | 91.5 | 83.7 | 79.4 | 76.9 | 63.2 | 55.1 |
| | Evaluation | +++ | +++ | +++ | +++ | +++ | ++ | + | + | + | − |
| | Lying state | 5.9 | 6.4 | 8.7 | 12.5 | 25.2 | 42.3 | 50.1 | 50.8 | 82.4 | 105.1 |
| | % | 0.0 | 0.2 | 1.4 | 3.3 | 9.7 | 18.2 | 22.1 | 22.5 | 38.3 | 49.6 |
| | Evaluation | − | + | ++ | +++ | +++ | +++ | +++ | +++ | +++ | +++ |
| | Comprehensive evaluation | − | + | ++ | +++ | +++ | ++ | + | + | + | − |
| Film D | Front state | 201.6 | 199.1 | 198.3 | 196.6 | 193.8 | 186.9 | 173.7 | 153.3 | 118.2 | 90.0 |
| | % | 99.9 | 98.7 | 98.3 | 97.4 | 96.0 | 92.6 | 86.1 | 76.0 | 58.6 | 44.6 |
| | Evaluation | +++ | +++ | +++ | +++ | +++ | +++ | ++ | + | + | − |
| | Lying state | 5.3 | 5.6 | 6.2 | 7.4 | 11.7 | 16.8 | 33.7 | 53.2 | 90.5 | 121.8 |
| | % | 0.0 | 0.2 | 0.4 | 1.0 | 3.2 | 5.7 | 14.1 | 23.7 | 42.2 | 57.7 |
| | Evaluation | − | + | + | ++ | +++ | +++ | +++ | +++ | +++ | +++ |
| | Comprehensive evaluation | − | + | + | ++ | +++ | +++ | ++ | + | + | − |
| Film E | Front state | 201.7 | 199.8 | 198.7 | 197.3 | 194.3 | 187.2 | 174.0 | 153.7 | 118.7 | 90.2 |
| | % | 99.9 | 99.0 | 98.4 | 97.7 | 96.2 | 92.7 | 86.2 | 76.1 | 58.8 | 44.7 |
| | Evaluation | +++ | +++ | +++ | +++ | +++ | +++ | ++ | + | + | − |
| | Lying state | 5.3 | 5.6 | 6.1 | 7.4 | 11.7 | 16.7 | 33.7 | 53.1 | 90.5 | 121.8 |
| | % | 0.0 | 0.1 | 0.4 | 1.0 | 3.2 | 5.7 | 14.1 | 23.7 | 42.2 | 57.7 |
| | Evaluation | − | + | + | ++ | +++ | +++ | +++ | +++ | +++ | +++ |
| | Comprehensive evaluation | − | + | + | ++ | +++ | +++ | ++ | + | + | − |
| Film F | Front state | 198.1 | 196.6 | 193.0 | 188.6 | 180.1 | 165.3 | 155.9 | 152.4 | 125.5 | 105.4 |
| | % | 99.9 | 99.1 | 97.3 | 95.1 | 90.8 | 83.3 | 78.6 | 76.9 | 63.3 | 53.2 |
| | Evaluation | +++ | +++ | +++ | +++ | +++ | ++ | + | + | + | − |
| | Lying state | 5.9 | 6.4 | 8.7 | 12.5 | 25.3 | 42.4 | 50.0 | 50.8 | 82.3 | 105.1 |
| | % | 0.0 | 0.3 | 1.5 | 3.4 | 9.8 | 18.5 | 22.3 | 22.7 | 38.6 | 50.1 |
| | Evaluation | − | + | ++ | +++ | +++ | +++ | +++ | +++ | +++ | +++ |

TABLE 3-continued

| | | Angle between orthogonal axis and polarization axis | | | | | | | | | |
|---|---|---|---|---|---|---|---|---|---|---|---|
| Orthogonal axis tilt (°) | | 0 | 1 | 3 | 5 | 7 | 10 | 15 | 20 | 30 | 45 |
| | Comprehensive evaluation | − | + | ++ | +++ | +++ | ++ | + | + | + | − |
| Film G | Front state | 200.9 | 199.6 | 197.4 | 196.9 | 192.9 | 190.4 | 180.5 | 167.3 | 145.9 | 126.9 |
| | % | 99.9 | 99.3 | 98.2 | 97.9 | 95.9 | 94.7 | 89.7 | 83.2 | 72.6 | 63.1 |
| | Evaluation | +++ | +++ | +++ | +++ | +++ | +++ | ++ | ++ | + | + |
| | Lying state | 6.0 | 6.4 | 6.9 | 8.0 | 12.8 | 17.0 | 28.3 | 43.5 | 65.7 | 86.3 |
| | % | 0.0 | 0.2 | 0.5 | 1.0 | 3.4 | 5.5 | 11.1 | 18.7 | 29.7 | 40.4 |
| | Evaluation | − | + | + | ++ | +++ | +++ | +++ | +++ | +++ | +++ |
| | Comprehensive evaluation | − | + | + | ++ | +++ | +++ | ++ | ++ | + | + |
| Film H | Front state | 199.8 | 198.0 | 194.9 | 190.5 | 188.7 | 174.7 | 166.7 | 159.3 | 135.9 | 114.3 |
| | % | 99.9 | 99.0 | 97.5 | 95.3 | 94.4 | 87.4 | 83.3 | 79.7 | 68.0 | 57.2 |
| | Evaluation | +++ | +++ | +++ | +++ | +++ | ++ | ++ | + | + | − |
| | Lying state | 6.1 | 6.6 | 7.2 | 8.5 | 13.2 | 18.6 | 29.7 | 44.3 | 66.7 | 87.6 |
| | % | 0.0 | 0.3 | 0.6 | 1.3 | 3.6 | 6.3 | 11.8 | 19.2 | 30.3 | 40.8 |
| | Evaluation | − | + | + | ++ | +++ | +++ | +++ | +++ | +++ | +++ |
| | Comprehensive evaluation | − | + | + | ++ | +++ | ++ | ++ | + | + | − |
| Film J | Front state | 198.3 | 196.6 | 192.8 | 188.4 | 180.1 | 165.1 | 155.8 | 152.2 | 125.3 | 105.5 |
| | % | 99.9 | 99.0 | 97.1 | 94.9 | 90.7 | 83.2 | 78.5 | 76.7 | 63.1 | 53.1 |
| | Evaluation | +++ | +++ | +++ | +++ | +++ | ++ | + | + | + | − |
| | Lying state | 6.1 | 6.5 | 8.8 | 12.6 | 25.6 | 42.6 | 50.4 | 51.1 | 82.6 | 105.9 |
| | % | 0.0 | 0.3 | 1.4 | 3.3 | 9.9 | 18.4 | 22.4 | 22.7 | 38.6 | 50.3 |
| | Evaluation | − | + | ++ | +++ | +++ | +++ | +++ | +++ | +++ | +++ |
| | Comprehensive evaluation | − | + | ++ | +++ | +++ | ++ | + | + | + | − |
| Film K | Front state | 200.7 | 199.5 | 197.3 | 196.6 | 192.8 | 190.3 | 180.5 | 167.6 | 146.1 | 126.0 |
| | % | 99.9 | 99.3 | 98.2 | 97.9 | 96.0 | 94.7 | 89.8 | 83.4 | 72.7 | 62.7 |
| | Evaluation | +++ | +++ | +++ | +++ | +++ | +++ | ++ | ++ | + | + |
| | Lying state | 6.0 | 6.4 | 6.9 | 8.0 | 12.8 | 17.0 | 28.3 | 43.5 | 65.7 | 86.3 |
| | % | 0.0 | 0.2 | 0.5 | 1.0 | 3.4 | 5.5 | 11.1 | 18.7 | 29.7 | 40.0 |
| | Evaluation | − | + | + | ++ | +++ | +++ | +++ | +++ | +++ | +++ |
| | Comprehensive evaluation | − | + | + | ++ | +++ | +++ | ++ | ++ | + | + |
| Film L | Front state | 200.4 | 199.0 | 195.1 | 190.1 | 183.4 | 168.0 | 160.5 | 155.4 | 128.0 | 111.1 |
| | % | 99.9 | 99.2 | 97.3 | 94.8 | 91.4 | 83.7 | 80.0 | 77.5 | 63.8 | 55.4 |
| | Evaluation | +++ | +++ | +++ | +++ | +++ | ++ | ++ | + | + | − |
| | Lying state | 5.9 | 6.4 | 8.7 | 12.5 | 25.2 | 42.3 | 50.0 | 50.7 | 82.3 | 105.1 |
| | % | 0.0 | 0.3 | 1.4 | 3.3 | 9.7 | 18.2 | 22.0 | 22.4 | 38.1 | 49.5 |
| | Evaluation | − | + | ++ | +++ | +++ | +++ | +++ | +++ | +++ | +++ |
| | Comprehensive evaluation | − | + | ++ | +++ | +++ | ++ | ++ | + | + | − |
| Film M | Front state | 198.1 | 196.7 | 193.0 | 188.6 | 180.1 | 165.2 | 156.0 | 152.5 | 125.6 | 105.5 |
| | % | 99.9 | 99.2 | 97.3 | 95.1 | 90.8 | 83.3 | 78.7 | 76.9 | 63.3 | 53.2 |
| | Evaluation | +++ | +++ | +++ | +++ | +++ | ++ | + | + | + | − |
| | Lying state | 6.1 | 6.6 | 8.8 | 12.6 | 25.5 | 42.5 | 50.3 | 50.9 | 82.5 | 105.6 |
| | % | 0.0 | 0.3 | 1.4 | 3.3 | 9.8 | 18.4 | 22.4 | 22.7 | 38.6 | 50.2 |
| | Evaluation | − | + | ++ | +++ | +++ | +++ | +++ | +++ | +++ | +++ |
| | Comprehensive evaluation | − | + | ++ | +++ | +++ | ++ | + | + | + | − |

INDUSTRIAL APPLICABILITY

The polarizer, liquid crystal display device, and protective film of the present invention are very highly industrially applicable, because the use of them allows for the production of a liquid crystal display device capable of displaying three-dimensional images and having excellent visibility of three-dimensional images through a polarizing filter.

The invention claimed is:

1. A liquid crystal display device comprising a backlight light source, two polarizers, and a liquid crystal cell disposed between the two polarizers,
wherein
the polarizer on the viewing side of the liquid crystal cell comprises a polarizing film and an oriented film laminated on the viewing side of the polarizing film,
the tilt of the orientation axis or an axis orthogonal to the orientation axis of the oriented film relative to the polarization axis of the polarizing film is 1° or more and 10° or less,
the oriented film has an in-plane retardation of more than 7,200 nm and 30,000 nm or less, and
the oriented film has a ratio of in-plane retardation to thickness-direction retardation (Re/Rth) of 0.2 to 2.0.

2. The liquid crystal display device according to claim 1, wherein the oriented film comprises at least three layers, contains an ultraviolet absorber in the layer other than the outermost layers, and has a light transmittance at 380 nm of 20% or less.

3. The liquid crystal display device according to claim 1, wherein the oriented film has a ratio of in-plane retardation to thickness-direction retardation (Re/Rth) of 0.2 to 1.2.

4. The liquid crystal display device according to claim 1, wherein the oriented film is made of a polyester resin or a polycarbonate resin.

5. The liquid crystal display device according to claim 1, wherein the polarizer on the viewing side of the liquid crystal cell comprises a protective film disposed on the light-incoming side of the polarizing film.

6. The liquid crystal display device according to claim 1, wherein the backlight light source is a white light source having a continuous emission spectrum.

7. The liquid crystal display device according to claim 1 for making a three-dimensional image visible through a polarizing filter.

8. The liquid crystal display device according to claim 1, wherein the tilt of the orientation axis or an axis orthogonal to the orientation axis of the oriented film relative to the polarization axis of the polarizing film is 7° or more and 10° or less.

9. The liquid crystal display device according to claim 1, wherein the oriented film has an in-plane retardation of 7,350 nm or more and 30,000 nm or less.

10. The liquid crystal display device according to claim 5, wherein the protective film is selected from the group consisting of a triacetyl cellulose film, an acrylic film, and a norbornene film.

11. The liquid crystal display device according to claim 6, wherein the white light source having a continuous emission spectrum is a white light-emitting diode.

12. The liquid crystal display device according to claim 1, wherein the oriented film has a ratio of in-plane retardation to thickness-direction retardation (Re/Rth) of 0.5 to 1.2.

13. The liquid crystal display device according to claim 1, wherein the oriented film has a thickness of 25 µm or more and 100 µm or less.

14. The liquid crystal display device according to claim 1, wherein the oriented film has a thickness variation of 3.0% or less.

15. The liquid crystal display device according to claim 8, wherein the polarizer on the viewing side of the liquid crystal cell comprises a protective film disposed on the light-incoming side of the polarizing film, and wherein the protective film is selected from the group consisting of a triacetyl cellulose film, an acrylic film, and a norbornene film.

16. The liquid crystal display device according to claim 15, wherein the backlight light source is a white light source having a continuous emission spectrum.

17. The liquid crystal display device according to claim 15, wherein the oriented film has a thickness variation of 3.0% or less.

18. The liquid crystal display device according to claim 17, wherein the oriented film has a ratio of in-plane retardation to thickness-direction retardation (Re/Rth) of 0.2 to 1.2.

19. The liquid crystal display device according to claim 11, wherein the white light-emitting diode comprises a blue LED element and a yellow phosphor.

* * * * *